US010925127B2

(12) United States Patent
Kono et al.

(10) Patent No.: US 10,925,127 B2
(45) Date of Patent: *Feb. 16, 2021

(54) DISCHARGE LAMP DRIVE DEVICE, LIGHT SOURCE DEVICE, PROJECTOR, AND DISCHARGE LAMP DRIVE METHOD

(71) Applicant: SEIKO EPSON CORPORATION, Tokyo (JP)

(72) Inventors: Masaru Kono, Shimoina-gun (JP); Junichi Suzuki, Matsumoto (JP); Shun Sato, Matsumoto (JP); Yuichiro Iwama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 77 days.

This patent is subject to a terminal disclaimer.

(21) Appl. No.: 16/135,147

(22) Filed: Sep. 19, 2018

(65) Prior Publication Data

US 2019/0090333 A1 Mar. 21, 2019

(30) Foreign Application Priority Data

Sep. 20, 2017 (JP) ................................ 2017-180307

(51) Int. Cl.
*H05B 41/38* (2006.01)
*G03B 21/20* (2006.01)
(Continued)

(52) U.S. Cl.
CPC ......... *H05B 41/38* (2013.01); *G03B 21/2026* (2013.01); *G03B 21/2053* (2013.01);
(Continued)

(58) Field of Classification Search
CPC .......................... H05B 41/38; H05B 41/2925; H05B 41/2887; H05B 41/2928; H05B 41/2888;
(Continued)

(56) References Cited

U.S. PATENT DOCUMENTS 6,160,361 A 12/2000 Giannopoulos et al.
6,813,525 B2 11/2004 Reid et al.
(Continued)

FOREIGN PATENT DOCUMENTS

FR 2 926 183 A1 7/2009
FR 2926183 A1 * 7/2009 ......... H05B 41/2827
(Continued)

OTHER PUBLICATIONS

Feb. 11, 2019 Search Report issued in European Patent Application No. 18197518.6.
(Continued)

*Primary Examiner* — Michelle M Iacoletti
*Assistant Examiner* — Danell L Owens
(74) *Attorney, Agent, or Firm* — Oliff PLC

(57) ABSTRACT

A discharge lamp drive device includes a discharge lamp driver adapted to supply a drive current to a discharge lamp having a first electrode and a second electrode, a control section adapted to control the discharge lamp driver, and a storage section adapted to store a plurality of drive patterns of the drive current. The control section is adapted to select one drive pattern of the plurality of drive patterns based on machine learning, and execute the selected drive pattern.

17 Claims, 9 Drawing Sheets

(51) Int. Cl.
*H05B 41/292* (2006.01)
*H05B 41/288* (2006.01)
*H01J 61/86* (2006.01)

(52) U.S. Cl.
CPC .......... *H01J 61/86* (2013.01); *H05B 41/2887* (2013.01); *H05B 41/2888* (2013.01); *H05B 41/2925* (2013.01); *H05B 41/2928* (2013.01)

(58) Field of Classification Search
CPC .......... H05B 41/36; G03B 21/2053; G03B 21/2026; H01J 61/86
See application file for complete search history.

(56) References Cited

U.S. PATENT DOCUMENTS

| | | | |
|---|---|---|---|
| 8,044,334 | B2 | 10/2011 | Kagata et al. |
| 8,120,265 | B2 | 2/2012 | Van Casteren et al. |
| 8,120,285 | B2 | 2/2012 | Terashima et al. |
| 8,907,570 | B2 | 12/2014 | Kwag et al. |
| 9,538,627 | B2 | 1/2017 | Suzuki |
| 9,599,885 | B2 | 3/2017 | Narikawa |
| 9,730,304 | B2 | 8/2017 | Saka |
| 9,785,041 | B2 | 10/2017 | Sato et al. |
| 10,375,808 | B2 | 8/2019 | Suzuki et al. |
| 2002/0010518 | A1 | 1/2002 | Reid et al. |
| 2009/0237009 | A1 | 9/2009 | Okawa et al. |
| 2009/0237624 | A1 | 9/2009 | Soma et al. |
| 2010/0128232 | A1 | 5/2010 | Kagata et al. |
| 2010/0134033 | A1* | 6/2010 | Terashima ......... H05B 41/2887 315/246 |
| 2010/0201281 | A1* | 8/2010 | Terashima ......... G03B 21/2026 315/246 |
| 2010/0315015 | A1 | 12/2010 | Van Casteren et al. |
| 2011/0221348 | A1 | 9/2011 | Kwag et al. |
| 2012/0074858 | A1 | 3/2012 | Ono et al. |
| 2012/0162611 | A1 | 6/2012 | Terashima et al. |
| 2014/0218697 | A1 | 8/2014 | Suzuki |
| 2015/0268544 | A1 | 9/2015 | Narikawa |
| 2016/0124293 | A1 | 5/2016 | Sato |
| 2016/0320693 | A1 | 11/2016 | Sato et al. |
| 2017/0142816 | A1 | 5/2017 | Saka |
| 2017/0155880 | A1 | 6/2017 | Nagata et al. |
| 2017/0219919 | A1 | 8/2017 | Kito et al. |

FOREIGN PATENT DOCUMENTS

| | | |
|---|---|---|
| JP | 2008-304588 A | 12/2008 |
| JP | 2009-169304 A | 7/2009 |
| JP | 2011-103310 A | 5/2011 |
| JP | 4692611 B2 | 6/2011 |
| JP | 2016-018746 A | 2/2016 |
| JP | 2016-213011 A | 12/2016 |
| JP | 6136323 B2 | 5/2017 |

OTHER PUBLICATIONS

U.S. Appl. No. 16/145,748, filed Sep. 28, 2018 in the name of Sato et al.
Oct. 31, 2019 Office Action issued in U.S. Appl. No. 16/145,748.
Nov. 28, 2018 Extended European Search Report issued in European Patent Application No. 18195767.1.
Feb. 27, 2020 Notice of Allowance issued in U.S. Appl. No. 16/145,748.
Nov. 28, 2018 Extended European Search Report issued in European Patent Application No. 18195765.5.
Nov. 28, 2018 Extended Search Report issued in European Patent Application No. 18195670.7.
Apr. 3, 2019 Notice of Allownce issued in U.S. Appl. No. 16/135,274.
Apr. 17, 2020 Office Action issued in U.S. Appl. No. 16/135,082.
Nov. 9, 2020 Office Action issued in U.S. Appl. No. 16/135,082.

* cited by examiner

DISCHARGE LAMP DRIVE DEVICE, LIGHT SOURCE DEVICE, PROJECTOR, AND DISCHARGE LAMP DRIVE METHOD

BACKGROUND

1. Technical Field

The present invention relates to a discharge lamp drive device, a light source device, a projector, and a discharge lamp drive method.

2. Related Art

As shown in, for example, JP-A-2016-018746, there has been known a discharge lamp lighting device for changing a pulse of an AC current supplied to a discharge lamp in accordance with a value of an applied voltage applied to the discharge lamp.

However, there is an individual difference between the discharge lamps, and the change in the applied voltage (inter-electrode voltage) applied to the discharge lamp differs by the individual discharge lamp. Therefore, depending on the drive method which is not capable of considering the individual differences between the discharge lamps, the life of the discharge lamp cannot sufficiently be extended in some cases.

SUMMARY

An advantage of some aspects of the invention is to provide a discharge lamp drive device capable of extending the life of the discharge lamp irrespective of the individual difference between the discharge lamps, a light source device equipped with such a discharge lamp drive device, and a projector equipped with such a light source device. Another advantage of some aspects of the invention is to provide a discharge lamp drive method capable of extending the life of the discharge lamp irrespective of the individual difference between the discharge lamps.

A discharge lamp drive device according to an aspect of the invention includes a discharge lamp driver adapted to supply a drive current to a discharge lamp having a first electrode and a second electrode, a control section adapted to control the discharge lamp driver, and a storage section adapted to store a plurality of drive patterns of the drive current, and the control section is adapted to select one drive pattern of the plurality of drive patterns based on machine learning, and execute the selected drive pattern.

According to the discharge lamp drive device related to the aspect of the invention, the control section selects any one of the drive patterns based on the machine learning, and then executes the drive pattern thus selected. Therefore, by performing the machine learning, even in the case in which the individual difference exists between the discharge lamps, it is possible to select the preferable drive pattern in accordance with the individual difference between the discharge lamps. Therefore, according to the discharge lamp drive device related to this aspect of the invention, the life of the discharge lamp can be extended irrespective of the individual difference between the discharge lamps.

Further, since the drive pattern is selected based on the machine learning, even in the case in which the drive power to be supplied to the discharge lamp is changed, the preferable drive pattern can be selected in accordance with the change in the drive power. Thus, it becomes possible to easily change the drive power to be supplied to the discharge lamp in multiple levels. Further, since it becomes possible to arbitrarily change the drive power, it becomes possible to use the drive power as one of the drive parameters of the drive pattern to be changed when extending the life of the discharge lamp. Thus, it is possible to further extend the life of the discharge lamp.

The discharge lamp drive device may be configured such that the discharge lamp drive device further includes a voltage detection section adapted to detect an inter-electrode voltage of the discharge lamp, and the control section performs selection of the drive pattern based on a change in the inter-electrode voltage.

According to this configuration, by detecting the inter-electrode voltage, it is possible to perform the selection of the drive pattern, and it is possible to preferably and easily perform the machine learning.

The discharge lamp drive device may be configured such that, in a case where the change in the inter-electrode voltage fulfills a first predetermined condition when the selected drive pattern is being executed, the control section switches from the selected drive pattern to another drive pattern.

According to this configuration, in the case in which the drive pattern thus selected is an undesirable drive pattern for extending the life with respect to the state of the discharge lamp at that moment, it is possible to switch the drive pattern to another desirable drive pattern. Therefore, it is possible to prevent the life of the discharge lamp from being shortened.

The discharge lamp drive device may be configured such that the control section is configured to prevent the execution of the selected drive pattern for a predetermined period from when switching to the another drive pattern.

According to this configuration, it is possible to prevent the drive pattern having a high possibility of shortening the life of the discharge lamp from being executed, and thus, the life of the discharge lamp can further be extended.

The discharge lamp drive device may be configured such that the control section executes, in a certain period, both of a drive pattern which makes the inter-electrode voltage closest to a predetermined voltage value out of the plurality of drive patterns, and a different one of the plurality of drive patterns from the drive pattern which makes the inter-electrode voltage closest to the predetermined voltage value.

According to this configuration, it is possible to execute another drive pattern between the drive patterns for achieving the closest approach to the predetermined voltage value, and it is easy to dramatically change the stimulus of the thermal load applied to the first electrode. Therefore, it is easy to grow the projection, and thus, it is easy to further extend the life of the discharge lamp.

The discharge lamp drive device may be configured such that, in a case where the change in the inter-electrode voltage between before execution of the selected drive pattern and after the execution of the selected drive pattern fulfills a second predetermined condition, the control section executes the selected drive pattern a plurality of times in a row.

According to this configuration, it is possible to realize the configuration having a random nature that one of two or more drive patterns is selected and executed in one condition based on the machine learning on the one hand, and also having a nature that the same drive pattern is to be continuously executed in the case in which the drive pattern selected fulfills the second condition on the other hand. Thus, it is possible to execute the drive pattern preferable for extending the life of the discharge lamp a plurality of times in a row, and it is easy to further extend the life of the discharge lamp.

The discharge lamp drive device may be configured such that, in a case where the inter-electrode voltage decreases by a predetermined value or more, the control section switches the drive pattern to last-time-executed drive pattern.

According to this configuration, for example, in the case in which the projection moves, and the inter-electrode voltage drops rapidly, it is possible to switch to the drive pattern executed before the projection moves. Thus, it is easy to correct the position of the projection to the position before moving.

The discharge lamp drive device may be configured such that, in a case where a predetermined time has elapsed from a start of the execution of the selected drive pattern, the control section selects a different one of the plurality of drive patterns from the selected drive pattern, and the control section changes a length of the predetermined time based on the inter-electrode voltage.

Therefore, it is possible to arbitrarily switch between the drive patterns in accordance with the change in the inter-electrode voltage, and thus, it is possible to further extend the life of the discharge lamp. Further, for example, if the discharge lamp deteriorates, the time until the change in the inter-electrode voltage due to the drive pattern appears becomes long in some cases. In such a case, if the execution time of the drive pattern is short, the drive pattern cannot appropriately be evaluated in some cases. To cope with the above, by changing the predetermined time based on the inter-electrode voltage, it is possible to elongate the predetermined time in the case in which the discharge lamp has deteriorated. Therefore, it is easy to appropriately evaluate the drive pattern, and as a result, the life of the discharge lamp can be extended.

A light source device according to an aspect of the invention includes a discharge lamp adapted to emit light, and any one of the discharge lamp drive devices described above.

According to the light source device related to the aspect of the invention, since the discharge lamp drive device described above is provided, the life of the discharge lamp can be extended similarly to the aspects described above.

A projector according to an aspect of the invention includes the light source device described above, a light modulation device adapted to modulate light emitted from the light source device in accordance with an image signal, and a projection optical system adapted to project the light modulated by the light modulation device.

According to the projector related to the aspect of the invention, since the light source device described above is provided, the life of the discharge lamp can be extended similarly to the aspects described above.

A discharge lamp drive method according to an aspect of the invention is a discharge lamp drive method adapted to supply a drive current to a discharge lamp having a first electrode and a second electrode to drive the discharge lamp, the method including the steps of selecting one drive pattern of a plurality of drive patterns of the drive current based on machine learning, and executing the selected drive pattern.

According to the discharge lamp drive method related to the aspect of the invention, the life of the discharge lamp can be extended similarly to the aspects described above.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
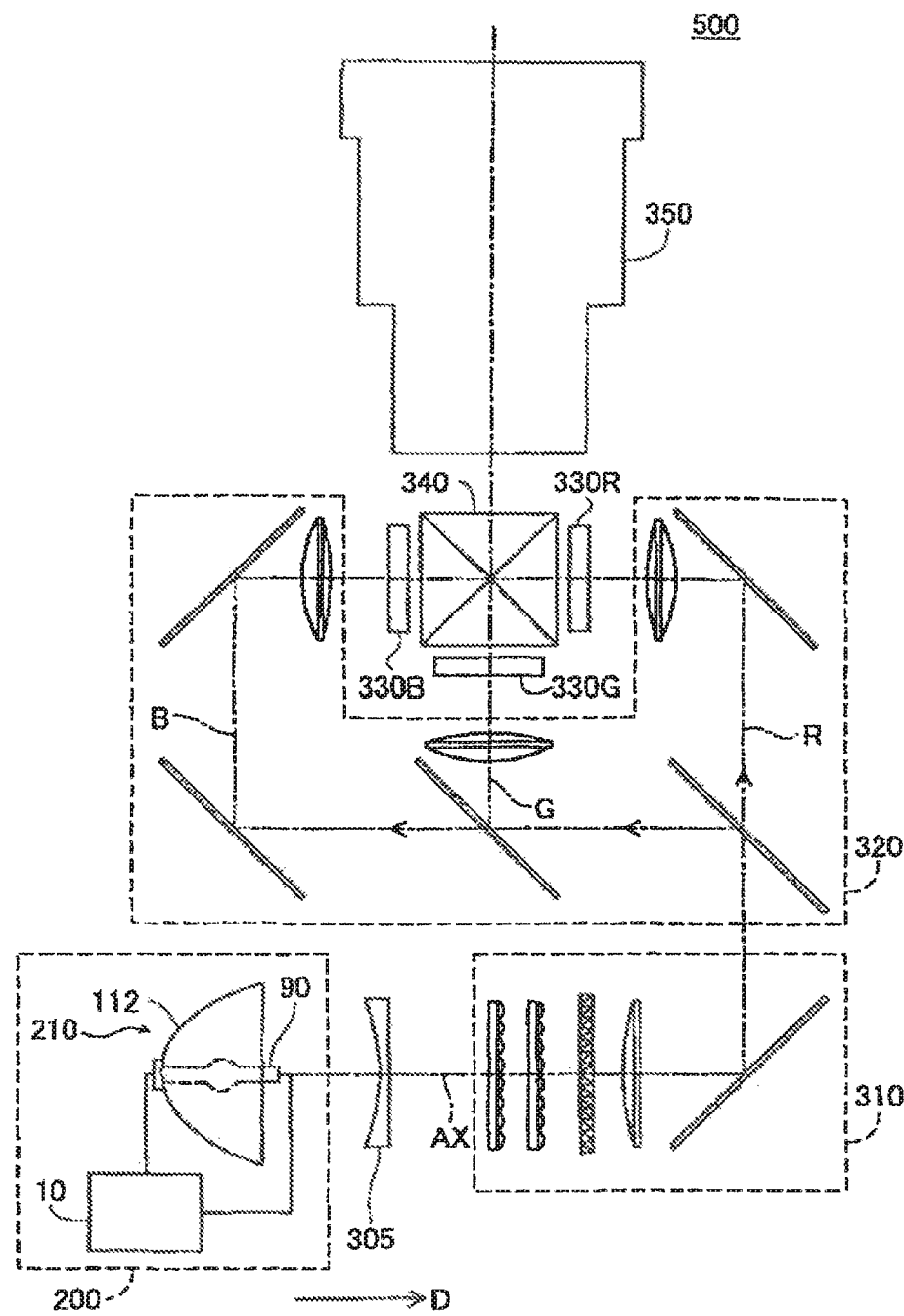
FIG. 1 is a schematic configuration diagram showing a projector according to an embodiment of the invention.

A projector according to an embodiment of the invention will hereinafter be described with reference to the accompanying drawings.

It should be noted that the scope of the invention is not limited to the embodiment hereinafter described, but can arbitrarily be modified within the technical idea or the technical concept of the invention. Further, in the drawings described below, the actual structures and the structures of the drawings are made different from each other in scale size, number, and so on of each of the constituents in some cases in order to make the constituents easy to understand.

FIG. 1 is a schematic configuration diagram showing the projector 500 according to the present embodiment. As shown in FIG. 1, the projector 500 according to the present embodiment is provided with a light source device 200, a collimating lens 305, an illumination optical system 310, a color separation optical system 320, three liquid crystal light valves (light modulation devices) 330R, 330G, and 330B, a cross dichroic prism 340, and a projection optical system 350.

The light emitted from the light source device 200 passes through the collimating lens 305, and then enters the illumination optical system 310. The collimating lens 305 collimates the light from the light source device 200.

The illumination optical system 310 adjusts the illuminance of the light emitted from the light source device 200 so as to be homogenized on the liquid crystal light valves 330R, 330G, and 330B. Further, the illumination optical system 310 uniforms the polarization direction of the light emitted from the light source device 200 into one direction. The reason therefor is to effectively utilize the light emitted from the light source device 200 in the liquid crystal light valves 330R, 330G, and 330B.

The light adjusted in the illuminance and the polarization direction enters the color separation optical system 320. The color separation optical system 320 separates the incident light into three colored light beams, namely a red light beam (R), a green light beam (G), and a blue light beam (B). The liquid crystal light valves 330R, 330G, and 330B associated with the respective colored light beams modulate the three colored light beams, respectively, in accordance with an image signal. The liquid crystal light valves 330R, 330G, and 330B are provided with liquid crystal panels 560R, 560G, and 560B described later, and polarization plates (not shown), respectively. The polarization plates are disposed on the light incident side and the light exit side of each of the liquid crystal panels 560R, 560G, and 560B.

The three colored light beams thus modulated are combined with each other by the cross dichroic prism 340. The composite light enters the projection optical system 350. The projection optical system 350 projects the incident light on a screen 700 (see FIG. 3). Thus, an image is displayed on the screen 700. It should be noted that a known configuration can be adopted as a configuration of each of the collimating lens 305, the illumination optical system 310, the color separation optical system 320, the cross dichroic prism 340, and the projection optical system 350.

Figure 2:
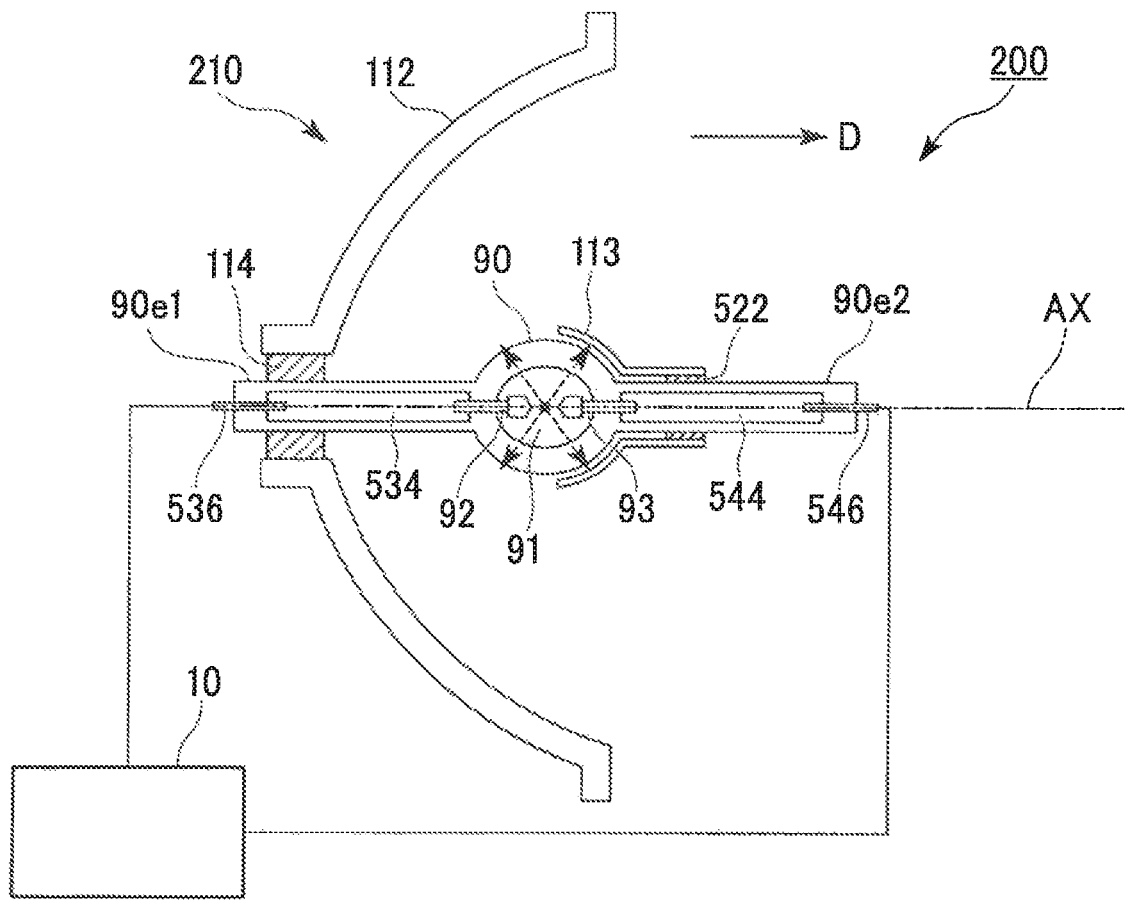
FIG. 2 is a diagram showing a discharge lamp in the embodiment.

FIG. 2 is a cross-sectional view showing a configuration of the light source device 200. The light source device 200 is provided with a light source unit 210 and a discharge lamp lighting device (discharge lamp drive device) 10. FIG. 2 shows a cross-sectional view of the light source unit 210. The light source unit 210 is provided with a main reflecting mirror 112, a discharge lamp 90, and a sub-reflecting mirror 113.

The discharge lamp lighting device 10 supplies the discharge lamp 90 with a drive current I to thereby light the discharge lamp 90. The main reflecting mirror 112 reflects the light, which is emitted from the discharge lamp 90, toward an irradiation direction D. The irradiation direction D is parallel to an optical axis AX of the discharge lamp 90.

The discharge lamp 90 has a rod-like shape extending along the irradiation direction D. One end part of the discharge lamp 90 is defined as a first end portion 90e1, and the other end part of the discharge lamp 90 is defined as a second end portion 90e2. A material of the discharge lamp 90 is a light transmissive material such as quartz glass. A central portion of the discharge lamp 90 bulges to have a spherical shape, and a discharge space 91 is formed inside the central portion. In the discharge space 91, there is encapsulated a gas as a discharge medium including a noble gas, a metallic halide, or the like.

In the discharge space 91, there are projected the tips of the first electrode 92 and the second electrode 93. The first electrode 92 is disposed on the first end portion 90e1 side of the discharge space 91. The second electrode 93 is disposed on the second end portion 90e2 side of the discharge space 91. Each of the first electrode 92 and the second electrode 93 has a rod-like shape extending along the optical axis AX. In the discharge space 91, there are disposed electrode tip portions of the first electrode 92 and the second electrode 93 so as to be opposed to each other with a predetermined distance. The material of the first electrode 92 and the second electrode 93 is metal such as tungsten.

The first end portion 90e1 of the discharge lamp 90 is provided with a first terminal 536. The first terminal 536 and the first electrode 92 are electrically connected to each other with a conductive member 534 penetrating the inside of the discharge lamp 90. Similarly, the second end portion 90e2 of the discharge lamp 90 is provided with a second terminal 546. The second terminal 546 and the second electrode 93 are electrically connected to each other with a conductive member 544 penetrating the inside of the discharge lamp 90. The material of the first terminal 536 and the second terminal 546 is metal such as tungsten. As the material of the conductive members 534, 544, there is used, for example, molybdenum foil.

The first terminal 536 and the second terminal 546 are connected to the discharge lamp lighting device 10. The discharge lamp lighting device 10 supplies the first terminal 536 and the second terminal 546 with the drive current I for driving the discharge lamp 90. As a result, arc discharge is caused between the first electrode 92 and the second electrode 93. The light (discharge light) generated by the arc discharge is emitted from the discharge position in all directions as indicated by the dashed arrows.

The main reflecting mirror 112 is fixed to the first end portion 90e1 of the discharge lamp 90 with a fixation member 114. Out of the discharge light, the light proceeding toward the opposite direction to the irradiation direction D is reflected by the main reflecting mirror 112 toward the irradiation direction D. The shape of the reflecting surface (the surface on the discharge lamp 90 side) of the main reflecting mirror 112 is not particularly limited as long as the discharge light can be reflected toward the irradiation direction D, and can also be, for example, a spheroidal shape or a paraboloidal shape. In the case of, for example, adopting the paraboloidal shape as the shape of the reflecting surface of the main reflecting mirror 112, the main reflecting mirror 112 is capable of converting the discharge light into the light roughly parallel to the optical axis AX. Thus, the collimating lens 305 can be eliminated.

The sub-reflecting mirror 113 is fixed to the second end portion 90e2 side of the discharge lamp 90 with a fixation member 522. A reflecting surface (a surface on the discharge lamp 90 side) of the sub-reflecting mirror 113 has a spherical shape surrounding a part on the second end portion 90e2 side of the discharge space 91. Out of the discharge light, the light proceeding toward the opposite side to the side where the main reflecting mirror 112 is disposed is reflected by the sub-reflecting mirror 113 toward the main reflecting mirror 112. Thus, the utilization efficiency of the light radiated from the discharge space 91 can be improved.

The material of the fixation members 114, 522 is not particularly limited as long as the material is a heat-resistant material tolerable to the heat generated by the discharge lamp 90, and is, for example, an inorganic adhesive. As the method of fixing the arrangement of the main reflecting mirror 112 and the sub-reflecting mirror 113 with respect to the discharge lamp 90, an arbitrary method can be adopted besides the method of fixing the main reflecting mirror 112 and the sub-reflecting mirror 113 to the discharge lamp 90. For example, it is also possible to fix the discharge lamp 90 and the main reflecting mirror 112 independently to a housing (not shown) of the projector 500. The same applies to the sub-reflecting mirror 113.

A circuit configuration of the projector 500 will hereinafter be described.

Figure 3:
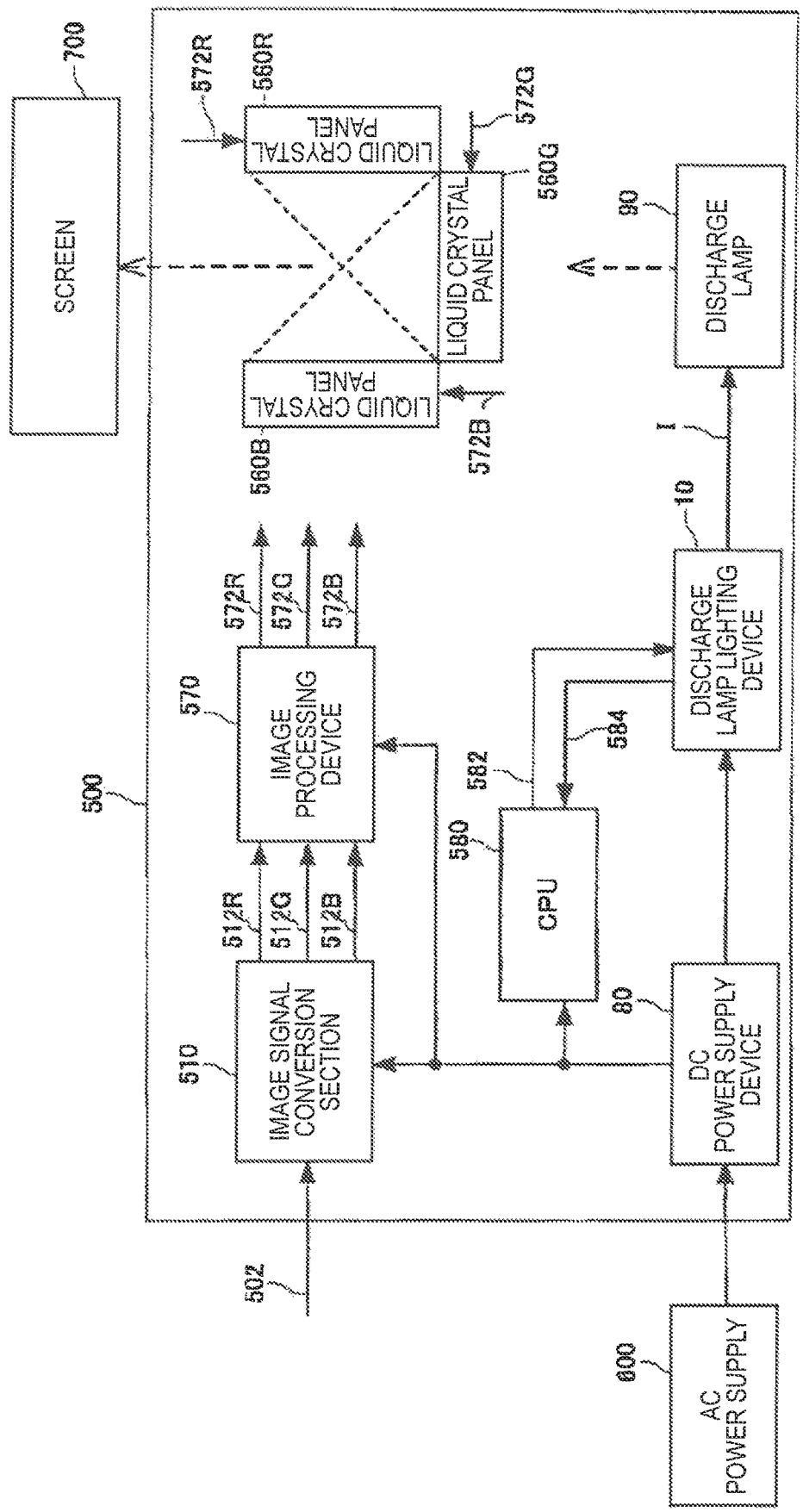
FIG. 3 is a block diagram showing a variety of constituents of the projector according to the embodiment.

FIG. 3 is a diagram showing an example of the circuit configuration of the projector 500 according to the present embodiment. The projector 500 is provided with an image signal conversion section 510, a DC power supply device 80, liquid crystal panels 560R, 560G, and 560B, an image processing device 570, and a central processing unit (CPU) 580 besides the optical system shown in FIG. 1.

The image signal conversion section 510 converts an image signal 502 (e.g., a luminance/color-difference signal or an analog RGB signal) input from the outside into a digital RGB signal of a predetermined word length to thereby generate image signals 512R, 512G, and 512B, and then supplies the image signals 512R, 512G, and 512B to the image processing device 570.

The image processing device 570 performs image processing on each of the three image signals 512R, 512G, and 512B. The image processing device 570 supplies the liquid crystal panels 560R, 560G, and 560B with drive signals 572R, 572G, and 572B for driving the liquid crystal panels 560R, 560G, and 560B, respectively.

The DC power supply device 80 converts the AC voltage supplied from an external AC power supply 600 into a constant DC voltage. The DC power supply device 80 supplies the DC voltage to the image signal conversion section 510 and the image processing device 570 located on the secondary side of a transformer (not shown, but included in the DC power supply device 80) and the discharge lamp lighting device 10 located on the primary side of the transformer.

The discharge lamp lighting device 10 generates a high voltage between the electrodes of the discharge lamp 90 at the time of startup to cause insulation breakdown to thereby form a discharge path. Thereafter, the discharge lamp lighting device 10 supplies the drive current I for the discharge lamp 90 to keep the discharge.

The liquid crystal panels 560R, 560G, and 560B are provided respectively to the liquid crystal light valves 330R, 330G, and 330B described above. The transmittance (luminance) of the colored light beams entering the liquid crystal panels 560R, 560G, and 560B via the optical system described above is modulated by liquid crystal panels 560R, 560G, and 560B based on the drive signals 572R, 572G, and 572B, respectively.

The CPU 580 controls a variety of operations of the projector 500 from the start of lighting to the extinction. For example, in the example shown in FIG. 3, a lighting command and an extinction command are output to the discharge lamp lighting device 10 via a communication signal 582. The CPU 580 receives lighting information of the discharge lamp 90 from the discharge lamp lighting device 10 via the communication signal 584.

A configuration of the discharge lamp lighting device 10 will hereinafter be described.

Figure 4:
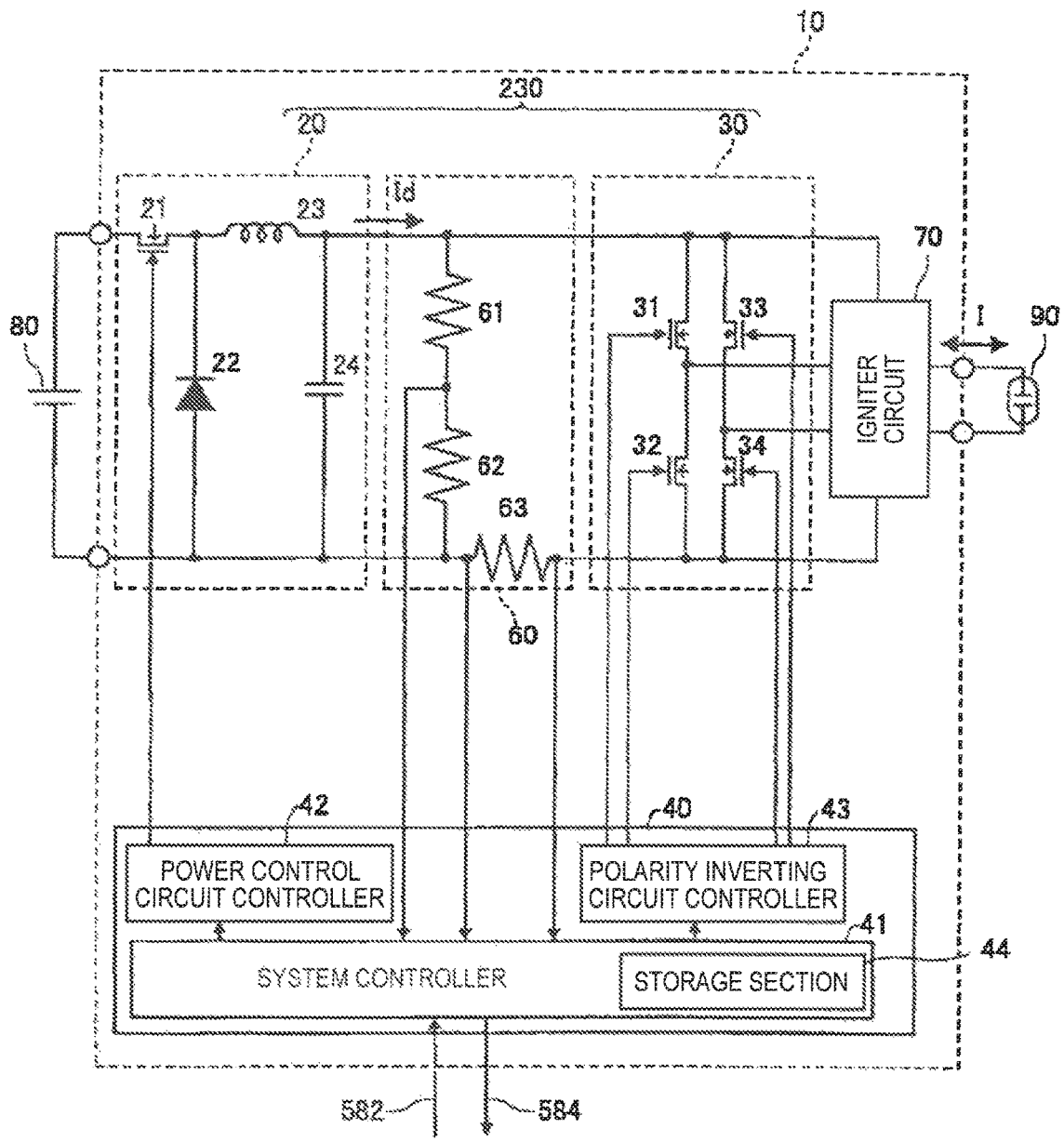
FIG. 4 is a circuit diagram of a discharge lamp lighting device of the embodiment.

FIG. 4 is a diagram showing an example of a circuit configuration of the discharge lamp lighting device 10.

As shown in FIG. 4, the discharge lamp lighting device 10 is provided with a power control circuit 20, a polarity inverting circuit 30, a control section 40, an operation detection section 60, and an igniter circuit 70.

The power control circuit 20 generates drive power Wd to be supplied to the discharge lamp 90. In the present embodiment, the power control circuit 20 is formed of a down-chopper circuit receiving a voltage from the DC power supply device 80 as an input, and stepping down the input voltage to output a DC current Id.

The power control circuit 20 is configured including a switch element 21, a diode 22, a coil 23, and a capacitor 24. The switch element 21 is formed of, for example, a transistor. In the present embodiment, one end of the switch element 21 is connected to a positive voltage side of the DC power supply device 80, and the other end thereof is connected to the cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power supply device 80. A current control signal is input to the control terminal of the switch element 21 from the control section 40 described later, and thus, ON/OFF of the switch element 21 is controlled. As the current control signal, a pulse width modulation (PWM) control signal can be used, for example.

When the switch element 21 is switched ON, a current flows through the coil 23, and energy is stored in the coil 23. Subsequently, when the switch element 21 is switched OFF, the energy stored in the coil 23 is released in the path passing through the capacitor 24 and the diode 22. As a result, the DC current Id according to a proportion of the ON time of the switch element 21 is generated.

The polarity inverting circuit 30 inverts the polarity of the DC current Id input from the power control circuit 20 at a predetermined timing. Thus, the polarity inverting circuit 30 generates and outputs the drive current I as a DC current lasting for the controlled time, or the drive current I as an AC current with an arbitrary frequency. In the present embodiment, the polarity inverting circuit 30 is formed of an inverter bridge circuit (a full bridge circuit).

The polarity inverting circuit 30 includes a first switch element 31, a second switch element 32, a third switch element 33, and a fourth switch element 34 each formed of, for example, a transistor. The polarity inverting circuit 30 has a configuration in which the first switch element 31 and the second switch element 32 connected in series to each other, and the third switch element 33 and the fourth switch element 34 connected in series to each other are connected in parallel to each other. Polarity inverting control signals are input from the control section 40 to control terminals of the first switch element 31, the second switch element 32, the third switch element 33, and the fourth switch element 34, respectively. Based on the polarity inverting control signals, ON/OFF operations of the first switch element 31, the second switch element 32, the third switch element 33, and the fourth switch element 34 are controlled, respectively.

In the polarity inverting circuit 30, there is repeated an operation of alternately switching ON/OFF a pair of the first switch element 31 and the fourth switch element 34 and a pair of the second switch element 32 and the third switch element 33. Thus, the polarity of the DC current Id output from the power control circuit 20 is alternately inverted. The polarity inverting circuit 30 generates and then outputs the drive current I as a DC current keeping the same polarity state for a controlled time, or the drive current I as an AC current with a controlled frequency from a common connection point to the first switch element 31 and the second switch element 32, and a common connection point to the third switch element 33 and the fourth switch element 34.

Specifically, the polarity inverting circuit 30 is controlled so that the second switch element 32 and the third switch element 33 are in the OFF state while the first switch element 31 and the fourth switch element 34 are in the ON state, and the second switch element 32 and the third switch element 33 are in the ON state while the first switch element 31 and the fourth switch element 34 are in the OFF state. Therefore, while the first switch element 31 and the fourth switch element 34 are in the ON state, there is generated the drive current I flowing from one end of the capacitor 24 through the first switch element 31, the discharge lamp 90, and the fourth switch element 34 in this order. While the second switch element 32 and the third switch element 33 are in the ON state, there is generated the drive current I flowing from one end of the capacitor 24 through the third switch element 33, the discharge lamp 90, and the second switch element 32 in this order.

In the present embodiment, a part obtained by combining the power control circuit 20 and the polarity inverting circuit 30 with each other corresponds to a discharge lamp driver 230. In other words, the discharge lamp driver 230 supplies the discharge lamp 90 with the drive current I for driving the discharge lamp 90.

The control section 40 controls the discharge lamp driver 230. In the example shown in FIG. 4, the control section 40 controls the power control circuit 20 and the polarity inverting circuit 30 to thereby control parameters such as the holding time during which the drive current I lasts in the same polarity, and the current value (the amount of electrical power of the drive power Wd) and the frequency of the drive current I. The control section 40 performs the polarity inverting control for controlling the holding time during which the drive current I lasts in the same polarity, and the frequency and so on of the drive current I on the polarity inverting circuit 30 based on the polarity inverting timing of the drive current I. The control section 40 performs, on the power control circuit 20, the current control for controlling the current value of the DC current Id output from the power control circuit 20.

In the present embodiment, the control section 40 is capable of performing, for example, the AC drive operation and the DC drive operation. The AC drive operation is the drive operation in which the AC current is supplied to the discharge lamp 90. The DC drive operation is the drive operation in which the DC current is supplied to the discharge lamp 90. A drive current waveform of the drive current I supplied to the discharge lamp 90 due to each of the types of the discharge lamp drive operation will be described later in detail.

The configuration of the control section 40 is not particularly limited. In the present embodiment, the control section 40 is configured including a system controller 41, a power control circuit controller 42, and a polarity inverting circuit controller 43. It should be noted that it is also possible to configure a part or the whole of the control section 40 with a semiconductor integrated circuit.

The system controller 41 controls the power control circuit controller 42 and the polarity inverting circuit controller 43 to thereby control the power control circuit 20 and the polarity inverting circuit 30. It is also possible for the system controller 41 to control the power control circuit controller 42 and the polarity inverting circuit controller 43 based on a lamp voltage (inter-electrode voltage) Vla and the drive current I detected by the operation detection section 60.

In the present embodiment, a storage section 44 is connected to the system controller 41.

It is also possible for the system controller 41 to control the power control circuit 20 and the polarity inverting circuit 30 based on the information stored in the storage section 44. The storage section 44 stores a plurality of drive patterns DW of the drive current I. More specifically, the storage section 44 stores, for example, information related to the drive parameters such as length of time during which the drive operation is performed, and the current value, the frequency, the number of periods, the polarity, the waveform, the modulation pattern and so on of the drive current I related to each of the drive operations constituting each of the drive patterns DW. Each of the drive patterns DW of the drive current I includes at least one of the AC drive operation and the DC drive operation described above. The details of the drive patterns DW will be described later in detail.

The power control circuit controller 42 outputs the current control signal to the power control circuit 20 based on the control signal from the system controller 41 to thereby control the power control circuit 20.

The polarity inverting circuit controller 43 outputs the polarity inverting control signal to the polarity inverting circuit 30 based on the control signal from the system controller 41 to thereby control the polarity inverting circuit 30.

The control section 40 performs machine learning. The control section 40 selects any one of the drive patterns DW stored in the storage section 44 based on the machine learning, and then executes the drive pattern DW thus selected. The details of the machine learning will be described later in detail.

The control section 40 is realized using a dedicated circuit, and can be arranged to perform the control described above and a variety of types of control of processes described later. In contrast, it is also possible to arrange the control section 40 so that, for example, the CPU executes a control program stored in the storage section 44 to thereby function as a computer to perform a variety of types of control of these processes.

Figure 5:
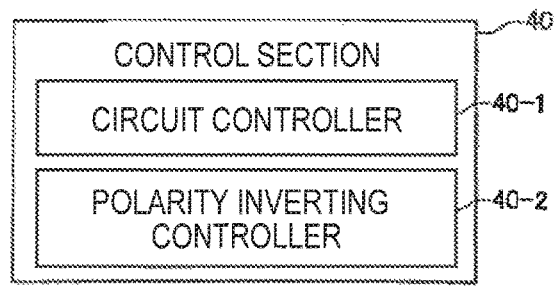
FIG. 5 is a block diagram showing a configuration example of a control section of the embodiment.

FIG. 5 is a diagram for explaining another configuration example of the control section 40. As shown in FIG. 5, the control section 40 can also be configured so as to function as a current controller 40-1 for controlling the power control circuit 20, and a polarity inverting controller 40-2 for controlling the polarity inverting circuit 30 due to the control program.

In the example shown in FIG. 4, the control section 40 is configured as a part of the discharge lamp lighting device 10. In contrast, it is also possible to adopt a configuration in which the CPU 580 assumes a part of the function of the control section 40.

In the present embodiment, the operation detection section 60 includes a voltage detection section for detecting the lamp voltage Vla of the discharge lamp 90 to output lamp voltage information to the control section 40. Further, it is also possible for the operation detection section 60 to include a current detection section for detecting the drive current I to output drive current information to the control section 40, and so on. In the present embodiment, the operation detection section 60 is configured including a first resistor 61, a second resistor 62, and a third resistor 63.

In the present embodiment, the voltage detection section of the operation detection section 60 detects the lamp voltage Vla using the voltage obtained by voltage dividing with the first resistor 61 and the second resistor 62 connected in series to each other and connected in parallel to the discharge lamp 90. Further, in the present embodiment, the current detection section detects the drive current I using the voltage generated in the third resistor 63 connected in series to the discharge lamp 90.

The igniter circuit 70 operates only when starting to light the discharge lamp 90. The igniter circuit 70 supplies a high voltage (a voltage higher than the voltage applied in the normal lighting of the discharge lamp 90) which is necessary for causing the dielectric breakdown between the electrodes (between the first electrode 92 and second electrode 93) of the discharge lamp 90 to form the discharge path when starting to light the discharge lamp 90, between the electrodes (between the first electrode 92 and second electrode 93) of the discharge lamp 90. In the present embodiment, the igniter circuit 70 is connected in parallel to the discharge lamp 90.

Figure 6A:
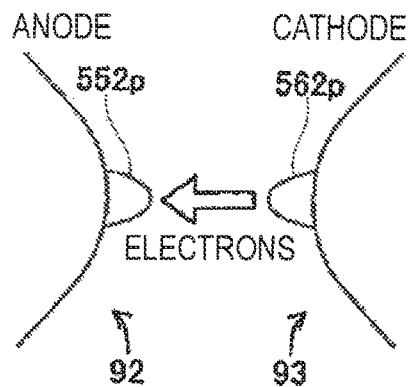
FIG. 6A is a diagram showing an appearance of a projection at a tip of an electrode of the discharge lamp.
Figure 6B:
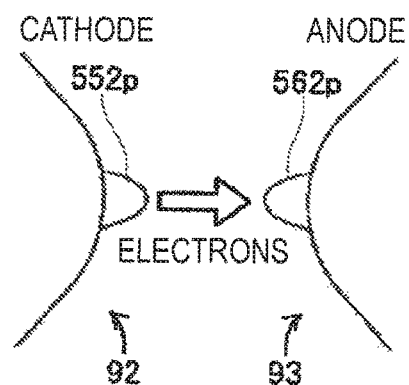
FIG. 6B is a diagram showing an appearance of the projection at the tip of the electrode of the discharge lamp.

FIG. 6A and FIG. 6B show tip portions of the first electrode 92 and the second electrode 93. At the tips of the first electrode 92 and the second electrode 93, there are respectively formed projections 552p, 562p. FIG. 6A shows a first polarity state in which the first electrode 92 acts as an anode, and the second electrode 93 acts as a cathode. In the first polarity state, electrons migrate from the second electrode 93 (the cathode) to the first electrode 92 (the anode) due to the discharge. The electrons are emitted from the cathode (the second electrode 93). The electrons emitted from the cathode (the second electrode 93) collide with the tip of the anode (the first electrode 92). The collision causes heat, and the temperature of the tip (the projection 552p) of the anode (the first electrode 92) rises.

FIG. 6B shows a second polarity state in which the first electrode 92 acts as the cathode, and the second electrode 93 acts as the anode. In the second polarity state, in contrast to the first polarity state, electrons migrate from the first electrode 92 to the second electrode 93. As a result, the temperature of the tip (the projection 562p) of the second electrode 93 rises.

As described above, by the drive current I being supplied to the discharge lamp 90, the temperature of the anode with which the electrons collide rises. In contrast, the temperature of the cathode emitting the electrons drops while emitting the electrons toward the anode.

An inter-electrode distance between the first electrode 92 and the second electrode 93 increases with the deterioration of the projections 552p, 562p. This is because the projections 552p, 562p wear. When the inter-electrode distance increases, the resistance between the first electrode 92 and the second electrode 93 increases, and therefore, the lamp voltage Vla rises. Therefore, by referring to the lamp voltage Vla, it is possible to detect the change in the inter-electrode distance, namely a degree of deterioration of the discharge lamp 90.

It should be noted that since the first electrode 92 and the second electrode 93 have substantially the same configurations, only the first electrode 92 will be described as a representative in some cases in the following description. Further, since the projection 552p of the tip of the first electrode 92 and the projection 562p of the tip of the second electrode 93 have substantially the same configurations, only the projection 552p will be described as a representative in some cases in the following description.

The control of the discharge lamp driver 230 by the control section 40 according to the present embodiment will hereinafter be described. In the present embodiment, the control section 40 controls the discharge lamp driver 230 using at least one of the AC drive operation and the DC drive operation.

In the present embodiment, the control section 40 is capable of executing a plurality of drive patterns DW including one or more drive operations described later combined with each other. In the present embodiment, each of the drive patterns DW has drive current waveforms different from each other in at least one of the drive parameters in each of the drive operations constituting the drive pattern DW.

Figure 7:
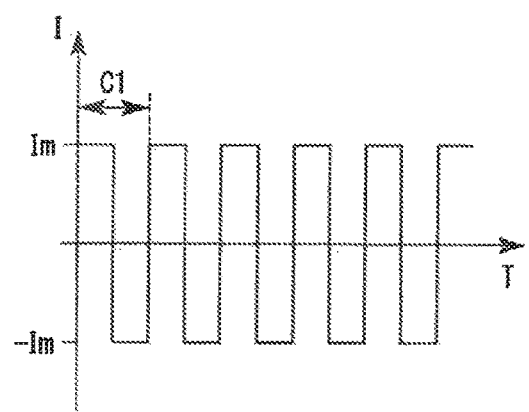
FIG. 7 is a diagram showing an example of a drive current waveform supplied to the discharge lamp in an AC drive operation of the embodiment.
Figure 8A:
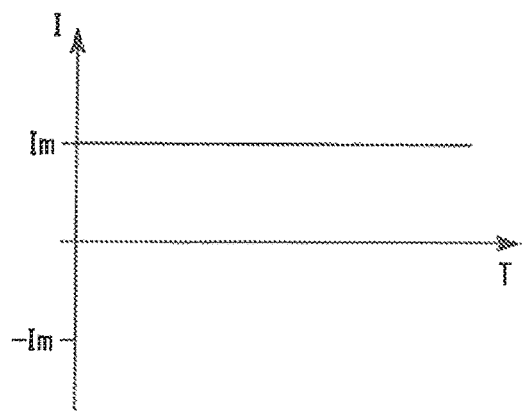
FIG. 8A is a diagram showing an example of a drive current waveform supplied to the discharge lamp in a DC drive operation of the embodiment.
Figure 8B:
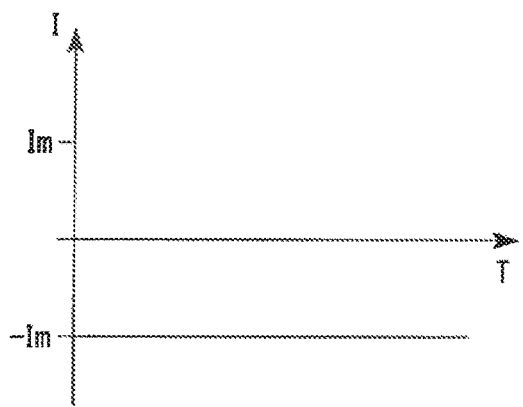
FIG. 8B is a diagram showing an example of the drive current waveform supplied to the discharge lamp in the DC drive operation of the embodiment.

Each of the drive operations will hereinafter be described. FIG. 7 is a diagram showing an example of the drive current waveform supplied to the discharge lamp 90 in the AC drive operation. FIG. 8A and FIG. 8B are each a diagram showing an example of the drive current waveform supplied to the discharge lamp 90 in the DC drive operation. In FIG. 7, FIG. 8A and FIG. 8B, the vertical axis represents the drive current I, and the horizontal axis represents time T. The drive current I is shown defining the case of the first polarity state as positive, and the case of the second polarity state as negative.

The drive current I supplied to the discharge lamp 90 in the AC drive operation shown in FIG. 7 is, for example, a rectangular wave AC current having the polarity inverted a plurality of times between the current value Im and the current value −Im. In the AC current shown in FIG. 7, the length of the period C1 is constant. The duty ratio of the AC current shown in FIG. 7 is 0.5 (50%).

The drive current I supplied to the discharge lamp 90 in the DC drive operation shown in FIG. 8A is a DC current with the first polarity having a constant current value Im. The drive current I supplied to the discharge lamp 90 in the DC drive operation shown in FIG. 8B is a DC current with the second polarity having a constant current value −Im.

Figure 9:
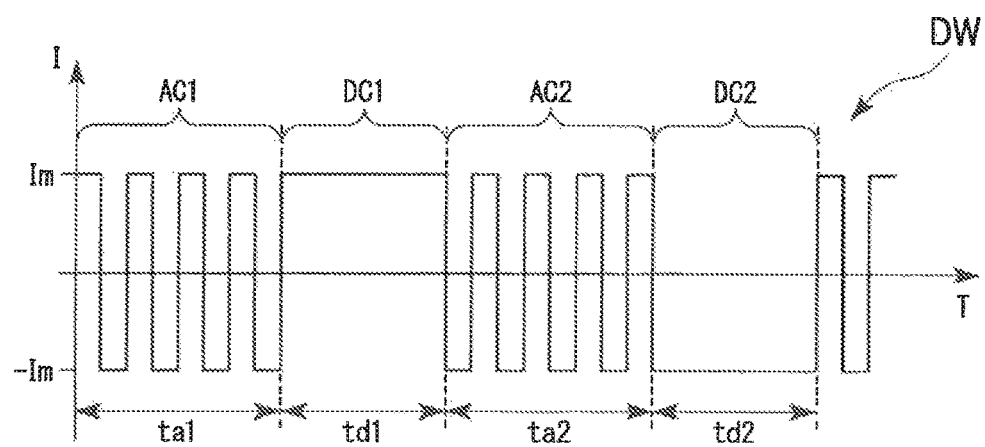
FIG. 9 is a diagram showing an example of a drive pattern of a drive current supplied to the discharge lamp in the embodiment.

FIG. 9 is a diagram showing an example of the drive pattern DW of the drive current I supplied to the discharge lamp 90 in the present embodiment. In FIG. 9, the vertical axis represents the drive current I, and the horizontal axis represents time T.

The drive pattern DW shown in FIG. 9 is constituted by the AC drive operation and the DC drive operation. More specifically, the drive pattern DW shown in FIG. 9 is constituted by a first AC drive operation AC1, a first DC drive operation DC1, a second AC drive operation AC2, and a second DC drive operation DC2. Further, the drive pattern DW has a plurality of drive parameters with respect to each of the AC drive operations and each of the DC drive operations. For example, the first AC drive operation AC1 has a length ta1 of the execution time of the AC drive operation and a first frequency f1 of the AC drive operation as the drive parameters. The first DC drive operation DC1 has a length td1 of the execution time of the DC drive operation and the first polarity as the drive parameters. The second AC drive operation AC2 has a length ta2 of the execution time of the AC drive operation and a second frequency f2 of the AC drive operation as the drive parameters. The second DC drive operation DC2 has a length td2 of the execution time of the DC drive operation and the second polarity as the drive parameters.

It should be noted that in the case of the drive pattern DW shown in FIG. 9, it is assumed that the length ta1 of the execution time of the first AC drive operation AC1 and the length ta2 of the execution time of the second AC drive operation AC2 are the same, and further, it is also assumed that the length td1 of the execution time of the first DC drive operation DC1 and the length td2 of the execution time of the second DC drive operation DC2 are the same. Further, in the case of the drive pattern DW shown in FIG. 9, it is assumed that the first frequency f1 of the AC current in the first AC drive operation AC1 and the second frequency f2 of the AC current in the second AC drive operation AC2 are the same.

The first frequency f1 and the second frequency f2 are, for example, no lower than 100 Hz and no higher than 1 kHz.

The length ta1 of the execution time of the first AC drive operation AC1 and the length ta2 of the execution time of the second AC drive operation AC2 are, for example, no less than 10 ms (milliseconds), and no more than 10 s (seconds). The length td1 of the execution time of the first DC drive operation DC1 and the length td2 of the execution time of the second DC drive operation DC2 are, for example, no less than 10 ms (milliseconds), and no more than 40 ms (milliseconds).

The plurality of drive patterns DW is configured by, for example, arbitrarily combining a plurality of numerical values selected from the numerical value ranges of the respective drive parameters in each of the drive operations. For example, the number of types of the drive parameters in each of the drive operations used in the combination is preferably no less than 2 and no more than 6, and the number of numerical values prepared for each of the types of the drive parameters is preferably no less than 2 and no more than 6. By combining these to configure the plurality of drive patterns DW, it is possible to obtain a preferable number of drive patterns DW.

For example, the drive parameters described in the drive pattern DW shown in FIG. 9 are the length of the execution time of the AC drive operation, the frequency of the AC current in the AC drive operation, the length of the execution time of the DC drive operation, and the polarity of the DC drive operation, and in this case, the total number of the types of the drive parameters in each of the drive operations is 4.

The drive patterns DW are different from each other in a value of at least one of the drive parameters described above. The number of the drive patterns DW is, for example, no less than 3 and no more than 150. The number of the drive patterns DW is preferably no less than 10 and no more than 100. The number of the drive patterns DW is more preferably no less than 20 and no more than 30. By setting the number of the drive patterns DW in such a manner, the life of the discharge lamp 90 can further be extended.

Then, switching between the drive patterns DW by the control section 40 of the present embodiment will be described. The control section 40 switches between the drive patterns DW based on the machine learning. In the present embodiment, the control section 40 makes an evaluation of the drive pattern DW based on the change of the lamp voltage Vla, and then makes a selection of the drive pattern DW based on the evaluation of the drive pattern DW.

Figure 10:
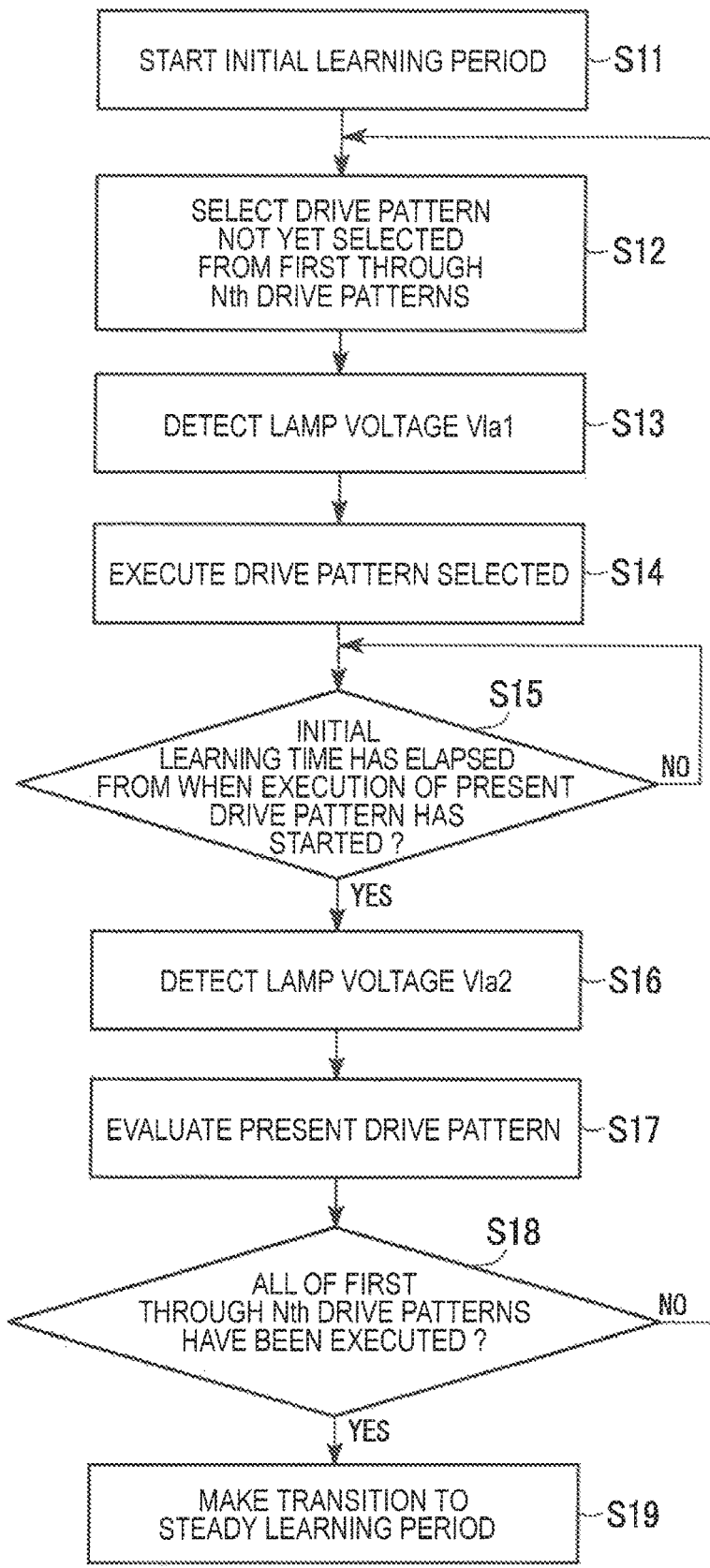
FIG. 10 is a flowchart showing an example of a control procedure of a control section in an initial learning period of the embodiment.

In the present embodiment, there are provided an initial learning period in which initial evaluations of the drive patterns DW are made, and a steady learning period set after the initial learning period. FIG. 10 is a flowchart showing an example of a control procedure of the control section 40 in the initial learning period. It should be noted that in the following description, it is assumed that N drive patterns DW are provided, and the numbers from first through Nth are assigned to the respective drive patterns DW.

As shown in FIG. 10, the control section 40 starts (step S11) the initial learning period, and then selects (step S12) the drive pattern DW which has not been previously selected in the initial learning period out of the first through Nth drive patterns DW. The control section 40 selects, for example, the drive pattern DW not having been selected at random. Since none of the drive patterns DW has been previously selected immediately after starting the initial learning period, the control section 40 selects one drive pattern DW from the first through Nth drive patterns DW. Then, the voltage detection section of the operation detection section 60 detects (step S13) the lamp voltage Vla1 of the discharge lamp 90, and the control section 40 stores the lamp voltage Vla thus detected to the storage section 44. Then, the control section 40 executes (step S14) the drive pattern DW thus selected.

After starting the execution of the drive pattern DW, the control section 40 determines (step S15) whether or not the initial learning time has elapsed after the execution of the drive pattern DW presently selected has been started. The length of the initial learning time is, for example, no less than 10 min (minutes) and no more than 120 min (minutes). In the case in which the initial learning time has not elapsed from when the execution of the drive pattern DW presently selected has been started (NO in the step S15), the control section 40 continues to execute the drive pattern DW presently selected.

In contrast, in the case in which the initial learning time has elapsed from when the execution of the drive pattern DW presently selected has been started (YES in the step S15), the voltage detection section of the operation detection section 60 detects (step S16) the lamp voltage Vla2 of the discharge lamp 90, and then the control section 40 stores the lamp voltage Vla2 thus detected in the storage section 44. Then, the control section 40 makes (step S17) an evaluation of the drive pattern DW presently selected.

In the present embodiment, the evaluation of the drive pattern DW is made based on the change in the lamp voltage Vla. Specifically, the control section 40 makes an evaluation of the drive pattern DW based on a value of the lamp voltage Vla2 obtained after the drive pattern DW thus selected is executed for the initial learning time, and a difference of the lamp voltage Vla2 obtained after the drive pattern DW thus selected is executed for the initial learning time from the lamp voltage Vla1 obtained before executing the drive pattern DW thus selected. In the following description, the difference of the lamp voltage Vla2 obtained after executing the drive pattern DW for the initial learning time from the lamp voltage Vla1 obtained before executing the drive pattern DW is called a first variation voltage value.

Here, a target numerical value range is set for the lamp voltage Vla. The control section 40 selects and executes the drive patterns DW so that the lamp voltage Vla can be kept in the target numerical value range if at all possible. The target numerical value range is, for example, no lower than 60 V, and no higher than 65 V. The cases in which the evaluation of the drive pattern DW becomes relatively high are, for example, the case in which the lamp voltage Vla (the lamp voltage Vla2 obtained after one drive pattern DW is executed for the initial learning time) falls within the target numerical value range due to the execution of the one drive pattern DW, the case in which the lamp voltage Vla comes closer to the target numerical value range due to the execution of one drive pattern DW, and the case in which the lamp voltage Vla can be kept within the target numerical value range before and after executing one drive pattern DW. Further, the cases in which the evaluation of the drive pattern DW is relatively low are, for example, the case in which the lamp voltage Vla runs off (move out of) the target numerical value range due to the execution of one drive pattern DW, and the case in which the lamp voltage Vla gets away from the target numerical value range due to the execution of one drive pattern DW.

As an example, in the case in which the lamp voltage Vla2 obtained after executing one drive pattern DW for the initial learning time is higher than the target numerical value range, and at the same time, the first variation voltage value is a negative value, the evaluation of the one drive pattern DW thus selected is relatively high. Further, in the case in which the lamp voltage Vla2 obtained after executing one drive pattern DW for the initial learning time is higher than the target numerical value range, and at the same time, the first variation voltage value is a positive value, the evaluation of the one drive pattern DW thus selected is relatively low. In contrast, in the case in which the lamp voltage Vla2 obtained after executing one drive pattern DW for the initial learning time is lower than the target numerical value range, and at the same time, the first variation voltage value is a negative value, the evaluation of the one drive pattern DW thus selected is relatively low. Further, in the case in which the lamp voltage Vla2 obtained after executing one drive pattern DW for the initial learning time is lower than the target numerical value range, and at the same time, the first variation voltage value is a positive value, the evaluation of the one drive pattern DW thus selected is relatively high. Further, in the case in which the lamp voltage Vla2 obtained after executing one drive pattern DW for the initial learning time is within the target numerical value range, the smaller the absolute value of the first variation voltage value is, the relatively higher the evaluation of the one drive pattern DW thus selected is, and in contrast, the larger the absolute value of the first variation voltage value is, the relatively lower the evaluation of the one drive pattern DW thus selected is.

It should be noted that the fact that the first variation voltage value is a negative value means the fact that the lamp voltage Via has dropped due to one drive pattern DW executed for the initial learning time. The fact that the first variation voltage value is a positive value means the fact that the lamp voltage Via has risen due to one drive pattern DW executed for the initial learning time.

After evaluating the drive pattern DW thus selected, the control section 40 determines (step S18) whether or not all of the first through Nth drive patterns DW have been executed in the initial learning period. In the case in which there is a drive pattern DW which has not been executed in the initial learning period in the first through Nth drive patterns DW (NO in the step S18), the control section 40 selects and then executes another drive pattern DW, and then evaluates the drive pattern DW thus selected (steps S12 through S17). In contrast, in the case in which all of the N patterns, namely the first through Nth drive patterns DW have been executed in the initial learning period (YES in the step S18), the control section 40 terminates the initial learning period to make (step S19) the transition to the steady learning period. The length of the initial learning period is, for example, shorter than 10 h (hours).

In the present embodiment, it is assumed that the lamp voltage Vla of the discharge lamp 90 is detected by the voltage detection section of the operation detection section 60 as the lamp voltage Vial obtained before executing the drive pattern DW thus selected after selecting the drive pattern DW not having been selected from the plurality of drive patterns DW in the step S12, but this is not a limitation. The lamp voltage Vial obtained before executing the Xth drive pattern DW thus selected can be set to, for example, the lamp voltage Vla2 detected after the (X−1)th drive pattern DW selected immediately before the Xth drive pattern DW thus selected is executed for the initial learning time. By adopting such control, the detection of the lamp voltage Vla1 in the step S13 becomes unnecessary, and thus, the process of the initial evaluation can further be simplified.

Figure 11:
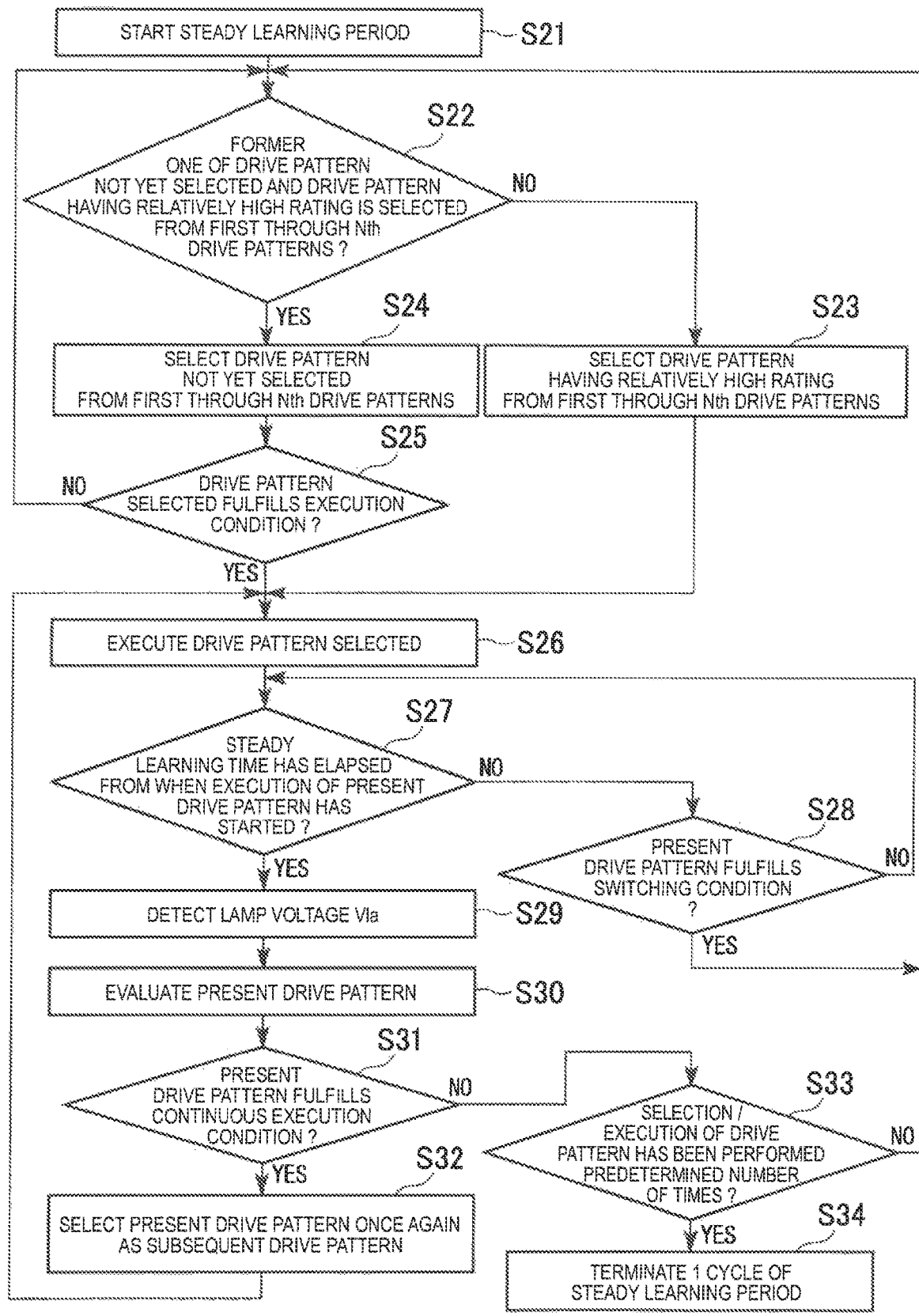
FIG. 11 is a flowchart showing an example of a control procedure of the control section in a steady learning period of the embodiment.

FIG. 11 is a flowchart showing an example of a control procedure of the control section 40 in the steady learning period. FIG. 11 shows one cycle in the steady learning period. In the steady learning period, the control section 40 repeatedly executes one cycle shown in FIG. 11. As shown in FIG. 11, the control section 40 starts (step S21) the steady learning period, and then selects either one of the drive pattern DW not having been selected in the steady learning period and the drive pattern DW having a relatively high rating out of the first through Nth drive patterns DW (steps S22 through S24). It should be noted that the control section 40 randomly selects the drive pattern DW from the first through Nth drive patterns DW, for example.

More specifically, for example, the control section 40 determines (step S22) whether or not former one (i.e., the drive pattern DW not having been selected in the steady learning period) of the drive pattern DW not having been selected in the steady learning period and the drive pattern DW having a relatively high rating is selected from the first through Nth drive patterns DW, and in the case in which the drive pattern DW having a relatively high rating is selected (NO in the step S22), the control section 40 selects (step S23) the drive pattern DW having a relatively high rating from the first through Nth drive patterns DW. For example, the control section 40 selects the drive pattern DW having the highest rating, namely the drive pattern DW which makes the lamp voltage Vla the closest to the target numerical value range (the predetermined voltage value) of the lamp voltage Vla, from the first through Nth drive patterns DW. Then, the control section 40 executes (step S26) the drive pattern DW thus selected in the step S23.

In contrast, in the case of selecting the former one, namely the drive pattern DW not having been selected in the steady learning period (YES in the step S22), the control section 40 selects (step S24) the drive pattern DW not having been selected from the first through Nth drive patterns DW. Then, in the case in which the drive pattern DW not having been selected in the steady learning period is selected, the control section 40 determines (step S25) whether or not the drive pattern DW thus selected fulfills the execution condition. The execution condition includes, for example, the fact that the drive pattern DW thus selected is not switched to another drive pattern DW in the step S28 described later last time the drive pattern DW thus selected is selected and then executed.

In the case in which the drive pattern DW selected in the step S24 fulfills the execution condition (YES in the step S25), the process makes the transition to the step S26, and the control section 40 executes the drive pattern DW thus selected. In contrast, in the case in which the drive pattern DW thus selected fails to fulfill the execution condition (NO in the step S25), the process makes the transition to the step S22, and the control section 40 selects another drive pattern DW from the first through Nth drive patterns DW, and then performs substantially the same determination as described above.

Then, after starting the execution of the drive pattern DW thus selected, the control section 40 determines (step S27) whether or not the steady learning time has elapsed after the execution of the drive pattern DW presently selected has been started. The steady learning time determined in the step S27 is the same as, for example, the initial learning time determined in the step S15 in the initial learning period. Therefore, the length of the steady learning time is, for example, no less than 10 min (minutes) and no more than 120 min (minutes). In the case in which the steady learning time has not elapsed from when the execution of the drive pattern DW presently selected has been started (NO in the step S27), the control section 40 determines (step S28) whether or not the present drive pattern DW fulfills a switching condition (a first predetermined condition).

The switching condition includes, for example, the fact that either one of a first switching condition and a second switching condition is fulfilled. The first switching condition is that the absolute value of the variation (the variation voltage value) of the lamp voltage Vla detected within the steady learning time becomes equal to or larger than a first predetermined value, and at the same time the lamp voltage Vla thus detected runs off the target numerical value range during the execution of the present drive pattern DW. The second switching condition includes the fact that the absolute value of the variation of the lamp voltage Vla becomes equal to or larger than a second predetermined value in the case in which the time having elapsed from when the execution of the present drive pattern DW has started is equal to or shorter than a first time. The first time is shorter than the steady learning time, and is, for example, 5 min (minutes). The second predetermined value is smaller than the first predetermined value. The first predetermined value is, for example, 5 V. The second predetermined value is, for example, 3 V.

Specifically, it is assumed that in the case in which the elapsed time is equal to or shorter than the first time, the switching condition (the second switching condition) is fulfilled even in the case in which the absolute value of the variation of the lamp voltage Vla has become equal to or larger than the second predetermined value smaller than the first predetermined value, and in the case in which the elapsed time exceeds the first time, the switching condition (the first switching condition) is not fulfilled unless the variation of the lamp voltage Vla becomes equal to or larger than the first predetermined value larger than the second predetermined value. By adopting such a relationship, the control section 40 determines the switching of the drive pattern DW presently selected in a phased manner based on the execution time of the drive pattern DW presently selected and the lamp voltage Vla.

In the case in which the drive pattern DW presently selected fulfills the switching condition (YES in the step S28), the control section 40 determines that the drive pattern DW presently selected is an undesirable drive pattern DW for extending the life of the discharge lamp 90 in the present state of the discharge lamp 90. Then, the control section 40 degrades the rating of the drive pattern DW presently selected.

Subsequently, the control section 40 performs the step S22 through the step S26 in substantially the same manner as described above to perform the selection and the execution of the next drive pattern DW. As described above, in the case in which the variation of the lamp voltage Vla fulfills the switching condition when executing the drive pattern DW, the control section 40 switches from the drive pattern DW presently selected to another drive pattern DW.

In contrast, in the case in which the present drive pattern DW does not fulfill the switching condition (NO in the step S28), the control section 40 executes the drive pattern DW presently selected until the steady learning time elapses. Further, in the case in which the steady learning time has elapsed from when the execution of the present drive pattern DW has started (YES in the step S27), the voltage detection section of the operation detection section 60 detects (step S29) the lamp voltage Via of the discharge lamp 90, and then the control section 40 stores the lamp voltage Vla thus detected in the storage section 44. Subsequently, the control section 40 makes (step S30) an evaluation of the drive pattern DW presently selected.

The evaluation of the drive pattern DW in the step S30 is substantially the same as, for example, the evaluation of the drive pattern DW in the step S17 in the initial learning period. Specifically, the control section 40 makes an evaluation of the drive pattern DW based on a value of the lamp voltage Vla obtained after the drive pattern DW thus selected is executed for the steady learning time, and a difference of the lamp voltage Vla obtained after the drive pattern DW is executed for the steady learning time from the lamp voltage Vla obtained before executing the drive pattern DW thus selected. In the following description, the difference of the lamp voltage Vla obtained after executing the drive pattern DW for the steady learning time from the lamp voltage Vla obtained before executing the drive pattern DW is called a second variation voltage value.

In the step S30, the control section 40 makes a re-evaluation of the drive pattern DW thus selected in the steady learning period. Specifically, the control section 40 updates evaluations of each of the drive patterns DW evaluated both in the initial learning period and in the steady learning period before the present moment.

Subsequently, the control section 40 determines (step S31) whether or not the drive pattern DW presently selected fulfills a continuous execution condition (a second predetermined condition). The continuous execution condition includes the fact that either one of a first continuous execution condition, a second continuous execution condition, and a third continuous execution condition is fulfilled. Each of the first continuous execution condition, the second continuous execution condition, and the third continuous execution condition includes the fact that the number of times of the continuous execution is equal to or smaller than a predetermined number of times. The predetermined number of times related to the number of times of the continuous execution is, for example, no smaller than twice and no larger than 15 times.

Further, the first continuous execution condition is that the lamp voltage Vla obtained after executing the drive pattern DW thus selected for the steady learning time is higher than the target numerical value range, and at the same time, the second variation voltage value is a negative value. The second continuous execution condition is that the lamp voltage Via is included in the target numerical value range before and after the execution of the drive pattern DW thus selected. The third continuous execution condition is that the lamp voltage Via obtained after executing the drive pattern DW thus selected for the steady learning time is lower than the target numerical value range, and at the same time, the second variation voltage value is a positive value.

In the case in which the present drive pattern DW fulfills the continuous execution condition (YES in the step S31), the control section 40 determines that the drive pattern DW presently selected is a preferable drive pattern DW for extending the life of the discharge lamp 90 in the present state of the discharge lamp 90. Then, the control section 40 selects (step S32) once again the drive pattern DW presently selected as the drive pattern DW to be subsequently executed. Then, the process makes the transition to the step S26, and the control section 40 continuously executes the previous drive pattern DW selected as the drive pattern DW to be executed this time.

As described hereinabove, in the present embodiment, in the case in which the variation of the lamp voltage Via before and after executing one drive pattern DW thus selected for the steady learning time fulfills the continuous execution condition, the control section 40 executes the same drive pattern DW a plurality of times continuously.

In contrast, in the case in which the present drive pattern DW fails to fulfill the continuous execution condition (NO in the step S31), the control section 40 determines (step S33) whether or not the selection and the execution of the drive pattern DW are performed a predetermined number of times in the step S22 through the step S26.

In the case in which the selection and the execution of the drive pattern DW are not performed the predetermined number of times (NO in the step S33), the process makes the transition to the step S22 to perform the selection of the drive pattern DW once again. The predetermined number of times related to the selection and the execution of the drive pattern DW in every cycle of the steady learning period is, for example, larger than the number N of the drive patterns DW.

In the case in which the selection and the execution of the drive pattern DW have been performed the predetermined number of times (YES in the step S33), the control section 40 terminates (step S34) the cycle of the steady learning period. The control section 40 repeats the cycle described above to continue to execute the steady learning period. The subsequent cycle is executed in the state of taking over the parameters from the previous cycle of the steady learning period except the fact that the number of times of the selection and the execution of the drive pattern DW is reset.

In such a manner as described above, the control section 40 performs the machine learning with the initial learning period and the steady learning period to select the drive pattern DW to be executed. The initial learning period is executed just one time after, for example, the projector 500 is lit for the first time. The steady learning period is always provided during the period in which the projector 500 is in the lighting state after, for example, the initial learning period is terminated. For example, in the case in which the projector 500 is powered OFF, and is then powered ON once again, the control section 40 resumes the period which has been executed last time the power has been switched OFF from the point where the period has been interrupted.

The discharge lamp lighting device 10 provided with the control section 40 for performing the control described above can also be expressed as a discharge lamp drive method. Specifically, the discharge lamp drive method according to one aspect of the present embodiment is a discharge lamp drive method of supplying the drive current I to the discharge lamp 90 having the first electrode 92 and the second electrode 93 to thereby drive the discharge lamp 90, and is characterized by selecting any one of the drive patterns DW of the drive current I based on the machine learning, and then executing the drive pattern DW thus selected.

For example, in the related art, since the drive pattern DW corresponding to the value of the lamp voltage Vla and the value of the drive power Wd is set in advance, in the case in which the lamp voltage Vla and the drive power Wd have the same values, the drive pattern DW to be executed is the unique drive pattern DW set in advance.

In contrast, in the present embodiment, since the drive pattern DW is selected due to the machine learning, in the case in which, for example, the lamp voltage Vla is at a predetermined voltage value, and the drive power Wd is at a predetermined power value, a plurality of drive patterns DW different in at least one of the drive parameters from each other is executed. Specifically, in the case in which, for example, the drive power Wd supplied to the discharge lamp 90 is in a predetermined power band, and the lamp voltage Vla of the discharge lamp 90 has a predetermined voltage value, the control section 40 executes at least three drive patterns DW. The at least three drive patterns DW are the drive patterns DW different from each other in the value of at least one of the drive parameters in the drive operation constituting one drive pattern DW. In other words, in the case of detecting the drive patterns DW of the drive current I supplied to the discharge lamp 90 setting the lamp voltage Vla constant and setting the power band of the drive power Wd constant, it is possible to detect at least three or more drive patterns DW different from each other. It should be noted that the predetermined power band means, for example, a numerical value range of the drive power Wd having a width no larger than about 10 W.

Further, if the selection and the execution of the drive pattern DW are executed using the machine learning as described above, in the case in which the lamp voltage Vla of the discharge lamp 90 has a predetermined voltage value, the drive pattern DW to be selected and executed is different due to the difference in accumulated lighting time of the discharge lamp 90 or the individual of the discharge lamp 90. Specifically, in the case in which the lamp voltage Vla of the discharge lamp 90 is at the predetermined voltage value, the control section 40 executes at least two drive patterns DW, for example, the first drive pattern and the second drive pattern, in accordance with at least one of the accumulated lighting time of the discharge lamp 90 and the individual of the discharge lamp 90.

The first drive pattern and the second drive pattern are any two of the drive patterns DW. The first drive pattern and the second drive pattern are different from each other in the value of at least one of the drive parameters in the drive operations constituting each of the drive patterns. It should be noted that the accumulated lighting time is the total sum of the time for which the discharge lamp 90 has been lit. In other words, the accumulated lighting time is the lighting time of the discharge lamp 90 accumulated from when the discharge lamp 90 has been lit for the first time.

Specifically, for example, the control section 40 executes the first drive pattern in the case in which the lamp voltage Vla has a predetermined voltage value and the accumulated lighting time is a first accumulated lighting time, or executes the second drive pattern in the case in which the lamp voltage Vla has the predetermined voltage value and the accumulated lighting time is a second accumulated lighting time different from the first accumulated lighting time. In other words, in the case of detecting the drive patterns DW of the drive current I supplied to the discharge lamp 90 setting the lamp voltage Vla constant, if the accumulated lighting time of the discharge lamp 90 varies, it is possible to detect at least two or more drive patterns DW different from each other.

Further, for example, the control section 40 executes the first drive pattern in the case in which the lamp voltage Vla has the predetermined voltage value and the discharge lamp 90 is a first individual, or executes the second drive pattern in the case in which the lamp voltage Vla has the predetermined voltage value and the discharge lamp 90 is a second individual different from the first individual. In other words, in the case of detecting the drive patterns DW of the drive current I supplied to the discharge lamp 90 setting the lamp voltage Vla constant, if the individual of the discharge lamp 90 changes, it is possible to detect at least two or more drive patterns DW different from each other.

It should be noted that the fact that the drive patterns are different in the value of at least one of the drive parameters from each other includes the case in which, for example, the drive operation constituting the drive pattern DW is different between the two drive patterns DW. More specifically, also in the case in which, for example, the first drive pattern is constituted by the AC drive operation, the second drive pattern is constituted by the DC drive operation and the AC drive operation, and the drive parameters related to the AC drive operation in the first drive pattern and the drive parameters related to the AC drive operation in the second drive pattern are the same, the first drive pattern and the second drive pattern are regarded as the drive patterns DW different in at least one of the drive parameters from each other. In this case, since the DC drive operation is not included in the first drive pattern, the drive parameters related to the DC drive operation in the first drive pattern are regarded as zero. Thus, in this case, the first drive pattern and the second drive pattern are different from each other in the drive parameters related to the DC drive operation.

According to the present embodiment, in such a manner as described above, the control section 40 selects any one of the drive patterns DW based on the machine learning, and then executes the drive pattern DW thus selected. Therefore, by performing the machine learning, even in the case in which the individual difference exists between the discharge lamps 90, it is possible to select the preferable drive pattern DW in accordance with the individual difference between the discharge lamps 90. Therefore, according to the present embodiment, it is possible to extend the life of the discharge lamp 90 irrespective of the individual difference between the discharge lamps 90.

Further, if the drive power Wd supplied to the discharge lamp 90 changes, the melting state and the growth state of the projection 552p of the first electrode 92 change. Therefore, in the past, it was necessary to determine the preferable drive patterns DW of the drive current I to be supplied to the discharge lamp 90 in accordance with the lamp voltage Vla and store the preferable drive patterns in the storage section 44 for each of the values of the drive power Wd to be supplied to the discharge lamp 90. Therefore, it was difficult to set the drive patterns DW corresponding to the lamp voltage Vla for each of the values of the drive power Wd, and there is adopted a specification in which the drive power Wd supplied to the discharge lamp 90 can only be changed to predetermined several levels of the drive power Wd.

In contrast, according to the present embodiment, since the drive pattern DW is selected based on the machine learning, even in the case in which the drive power Wd is changed, the preferable drive pattern DW can be selected in accordance with the change in the drive power Wd. Thus, it becomes possible to easily change the drive power Wd to be supplied to the discharge lamp 90 in multiple levels. Therefore, for example, it becomes possible for the user to arbitrarily change the drive power Wd to change the luminance of the picture projected from the projector 500 at will. Therefore, it becomes also possible to extend the life of the discharge lamp 90 while setting the drive power Wd relatively low to preferably reduce the power consumption of the projector 500.

Further, since it becomes possible to arbitrarily change the drive power Wd, it becomes possible to use the drive power Wd as one of the drive parameters of the drive pattern DW to be changed when extending the life of the discharge lamp 90. Thus, it is possible to further extend the life of the discharge lamp 90. For example, it is also possible to provide an operation section for changing the drive power Wd on the housing of the projector 500.

Further, according to the present embodiment, the control section 40 performs the selection of the drive pattern DW based on the change in the lamp voltage Via. Therefore, by detecting the lamp voltage Vla, it is possible to perform the selection of the drive pattern DW, and it is possible to preferably and easily perform the machine learning.

Further, according to the present embodiment, in the case in which the variation of the lamp voltage Vla thus detected fulfills the switching condition when executing the drive pattern DW thus selected, the control section 40 switches from the drive pattern DW thus selected to another drive pattern DW. Therefore, in the case in which the drive pattern DW thus selected is an undesirable drive pattern DW for extending the life with respect to the state of the discharge lamp 90 at that moment, it is possible to switch the drive pattern DW to another desirable drive pattern DW. Therefore, it is possible to prevent the life of the discharge lamp 90 from being shortened.

Further, as described above, the drive pattern DW having fulfilled the switching condition is degraded in rating, and is determined not to fulfill the execution condition when the drive pattern DW having fulfilled the switching condition is subsequently selected in the step S24 and then whether or not the drive pattern DW having fulfilled the switching condition fulfills the execution condition is determined in the step S25. In other words, the control section 40 does not execute the drive pattern DW having fulfilled the switching condition for a predetermined period. Therefore, according to the present embodiment, it is possible to prevent the drive pattern DW having a high possibility of shortening the life of the discharge lamp 90 from being executed, and thus, the life of the discharge lamp 90 can further be extended.

As described above, in the case in which the steady learning time has elapsed from when starting the execution of the drive pattern DW thus selected, the control section 40 selects the next drive pattern DW. Therefore, the length of the execution time (the predetermined time) of the drive pattern DW basically becomes equal to the length of the steady learning time. However, since the drive pattern DW selected in the steady learning period is switched to another drive pattern DW in some cases halfway before the steady learning time elapses depending on the state of the discharge lamp 90, the execution time (the predetermined time) of one drive pattern DW thus selected, namely a period from when starting the execution of the one drive pattern DW to when the one drive pattern DW is switched to the next drive pattern DW, changes in some cases even in the same drive pattern DW.

In other words, the control section 40 changes the length of the execution time (the predetermined time) in which the predetermined drive pattern DW out of the plurality of drive patterns DW is executed based on the lamp voltage Vla. Therefore, it is possible to arbitrarily switch between the drive patterns DW in accordance with the change in the lamp voltage Vla, and thus, it is possible to further extend the life of the discharge lamp 90.

Further, the length of the execution time in which a predetermined one of the drive patterns DW is executed changes in such a manner as described above, and therefore changes in accordance with the accumulated lighting time of the discharge lamp 90. Further, the length of the execution time in which the predetermined drive pattern out of the plurality of drive patterns DW is executed changes in such a manner as described above, and therefore changes in accordance with the individual of the discharge lamp 90. In the case in which the drive pattern DW selected has been switched halfway to another drive pattern DW, the execution time (the predetermined time) of the drive pattern DW thus selected is shorter than the steady learning time.

Further, in the case of, for example, always executing the same drive pattern DW even if the drive pattern DW has the highest rating, namely the drive pattern DW makes the lamp voltage Vla of the discharge lamp 90 the closest to the target numerical value range, it becomes difficult for the projection 552p of the first electrode 92 to grow in some cases, and it becomes difficult to sufficiently extend the life of the discharge lamp 90 in some cases. Further, for example, the melting state of the projection 552*p* of the first electrode 92 of the discharge lamp 90 changes with the deterioration of the discharge lamp 90, namely an increase in the accumulated lighting time. Therefore, even the drive pattern DW preferable for extending the life of the discharge lamp 90 at a certain time point becomes the drive pattern DW undesirable for extending the life of the discharge lamp 90 at another time point in some cases.

In contrast, according to the present embodiment, the control section 40 selects and executes one of the drive pattern DW not having been selected from the N drive patterns DW and the drive pattern DW having a relatively high rating in one cycle of the steady learning period. Therefore, in one cycle, both of the drive pattern DW having a relatively high rating including the drive pattern DW having the highest rating and the other drive pattern DW are executed. Specifically, the control section 40 of the present embodiment executes both of the drive pattern DW (hereinafter referred to as a high-rating drive pattern DWm) having a relatively high rating including the drive pattern DW having the highest rating of the plurality of drive patterns DW, and the drive pattern DW (hereinafter referred to as another drive pattern DWe) having a rating lower than the rating of the high-rating drive pattern DWm out of the plurality of the drive patterns DW in a certain period. Thus, it is possible to execute the other drive pattern DWe having a rating lower than the rating of the high-rating drive pattern DWm having a high rating between the high-rating drive pattern DWm, and it is easy to dramatically vary a stimulus of a thermal load applied to the first electrode 92. Therefore, it is easy to grow the projection 552*p*, and thus, it is easy to further extend the life of the discharge lamp 90.

Further, according to the present embodiment, in the case in which the variation of the lamp voltage Vla before and after executing the drive pattern DW selected fulfills the continuous execution condition, the control section 40 executes that drive pattern DW a plurality of times continuously. Here, in the present embodiment, there is adopted the configuration in which a plurality of drive patterns DW different in at least one of the drive parameters from each other is executed in the case in which the lamp voltage Vla is at a predetermined voltage value, and the drive power Wd is at a predetermined power value. In other words, the present embodiment has a random nature that one of two or more drive patterns DW is selected and executed in one condition on the one hand, and also has a nature that the same drive pattern is to be continuously executed in the case in which the drive pattern DW selected fulfills the continuous execution condition on the other hand. Therefore, it is possible to continuously execute the drive pattern DW preferable for extending the life of the discharge lamp 90 a plurality of times, and it is easy to further extend the life of the discharge lamp 90. Further, in the present embodiment, the continuous execution condition includes the fact that the number of continuous execution times is no larger than a predetermined number of times. Therefore, it is possible to continuously execute the preferable drive pattern DW the plurality of times in such execution time that the state of the discharge lamp 90 does not dramatically change. Therefore, it is easy to further extend the life of the discharge lamp 90.

Further, according to the present embodiment, the control section 40 performs the determination on whether or not the drive pattern DW fulfills the execution condition as shown in the step S25, and does not execute the drive pattern DW in the case in which the drive pattern DW does not fulfill the execution condition. Thus, it is difficult for the drive pattern DW having a relatively low rating to be executed. Therefore, it is easy to further extend the life of the discharge lamp 90.

Since the drive pattern DW is selected and then executed based on such machine learning as described above, in the present embodiment, the probability that the drive pattern DW is executed is different between the drive patterns DW irrespective of the lamp voltage Vla. Specifically, in the case in which the lamp voltage Vla of the discharge lamp 90 is at a predetermined voltage value, the probability that the first drive pattern is executed and the probability that the second drive pattern is executed are different from each other.

Further, in the execution period in which the first drive pattern and the second drive pattern are each executed at least one or more times, the proportion of the execution time in which the first drive pattern is executed to the length of the execution period and the proportion of the execution time in which the second drive pattern is executed to the length of the execution period are different from each other. The execution period corresponds to, for example, one cycle of the steady learning period.

Further, in the execution period in which the first drive pattern and the second drive pattern are each executed at least one or more times, namely one cycle of the steady learning period, for example, the number of times of the execution of the first drive pattern and the number of times of the execution of the second drive pattern are different from each other. In the case of defining the first drive pattern as the high-rating drive pattern DWm including the drive pattern DW having the highest rating, and the second drive pattern as one drive pattern DW of other drive patterns DWe, the number of times of the execution of the first drive pattern is larger than the number of times of the execution of the second drive pattern.

Further, for example, if the number (N) of the drive patterns DW to be selected is too small, the preferable drive pattern DW corresponding to the state of the discharge lamp 90 fails to be included in some cases. In contrast, if the number of the drive patterns DW is too large, it takes time to execute the initial learning period, and it takes time until the preferable drive pattern DW is selected. Further, in the steady learning period, the proportion of executing the drive pattern other than the preferable drive pattern DW becomes large.

In contrast, if the number of the drive patterns DW is made no less than 10 and no more than 100, it is possible to make it easy to select the preferable drive pattern DW corresponding to the state of the discharge lamp 90, and to shorten the length of the initial learning period. Further, since the proportion of the preferable drive pattern DW can be made large in the steady learning period, the life of the discharge lamp 90 can further be extended. Further, if the number of the drive patterns DW is made no smaller than 20 and no larger than 30, there advantages can be obtained in an enhanced manner.

It should be noted that in the present embodiment, it is also possible to adopt the configurations and methods described below.

As long as the control section 40 selects and then executes the drive pattern DW based on the machine learning, the method of the machine learning is not particularly limited. The evaluation method of the drive pattern DW described above is not particularly limited. The initial learning time and the steady learning time can also be different from each other.

Further, it is possible for the control section 40 to switch the drive pattern DW to the drive pattern DW executed last time in the case in which the lamp voltage Vla has dropped as much as a third predetermined value (a predetermined value) or more. More specifically, for example, in the case in which a selected one of the drive patterns DW is executed, the control section 40 determines whether or not the lamp voltage Vla drops as much as the third predetermined value or more based on the lamp voltage Vla having been detected within the steady learning time, and performs the switching to the drive pattern DW executed last time in the case in which the lamp voltage Vla has dropped as much as the third predetermined value or more. According to this configuration, for example, in the case in which the projection 552p moves, and the lamp voltage Vla drops rapidly, it is possible to perform switching to the drive pattern DW executed before the projection 552p moves. Thus, it is easy to correct the position of the projection 552p to the position before moving. Further, it is possible for the control section 40 to switch the drive pattern DW to the drive pattern DW different from the drive pattern DW executed last time in the case in which the lamp voltage Vla has dropped as much as the third predetermined value (the predetermined value) or more.

Further, it is also possible for the control section 40 to change the length of the steady learning time based on the lamp voltage Vla. For example, if the discharge lamp 90 deteriorates, the time until the change in the lamp voltage Vla due to the drive pattern DW occurs becomes long in some cases. In such a case, if the execution time of the drive pattern DW is short, the drive pattern DW cannot appropriately be evaluated in some cases. To cope with the above, by changing the length of the steady learning time based on the lamp voltage Vla, it is possible to elongate the steady learning time to elongate the execution time (the predetermined time) of the drive pattern DW in the case in which the discharge lamp 90 has deteriorated. Therefore, it is easy to appropriately evaluate the drive pattern DW, and as a result, the life of the discharge lamp 90 can be extended.

Further, it is also possible for the control section 40 to change the number of the drive patterns DW, or change the types of the drive parameters in each of the drive operations of the drive patterns DW based on the lamp voltage Via. In these cases, it is also possible for the control section 40 to change the number of the types of the drive parameters which are different between the drive patterns DW based on the lamp voltage Vla. For example, it is also possible for the control section 40 to increase the number of the types of the drive parameters which are different between the drive patterns DW in the case in which the lamp voltage Vla is higher than a first voltage. According to this configuration, in the case in which the discharge lamp 90 has deteriorated, it is easy to increase the stimulus due to the change in the thermal load applied to the first electrode 92, and it is possible to further extend the life of the discharge lamp 90.

Further, it is also possible for the control section 40 to select the drive pattern DW based on the change in the lamp voltage Vla occurring until just before the selection. Further, it is also possible for the control section 40 to arrange that each of all of the drive patterns DW is executed one or more times without fail in each cycle in the steady learning period. Further, it is also possible for the control section 40 to create the drive pattern DW other than the plurality of drive patterns DW set in advance in the steady learning period. In this case, it is also possible for the control section 40 to combine the drive parameters to create the new drive pattern DW based on the ratings of the respective drive patterns DW set in advance.

Further, in the step S15 in the initial learning period, it is also possible for the control section 40 to determine whether or not the drive pattern DW presently selected fulfills the switching condition as in the step S28 in the steady learning period. For example, in the case in which the drive pattern DW presently selected fulfills the switching condition, it is also possible for the control section 40 to lower the rating of the drive pattern DW presently selected to perform the switching from the drive pattern DW presently selected to another of the drive patterns DW. In contrast, in the case in which the drive pattern DW presently selected does not fulfill the switching condition, it is also possible for the control section 40 to execute the drive pattern DW presently selected until the initial learning time elapses. It should be noted that the switching condition on this occasion can be the same as the switching condition in the step S28, or can also be different therefrom.

Figure 12A:
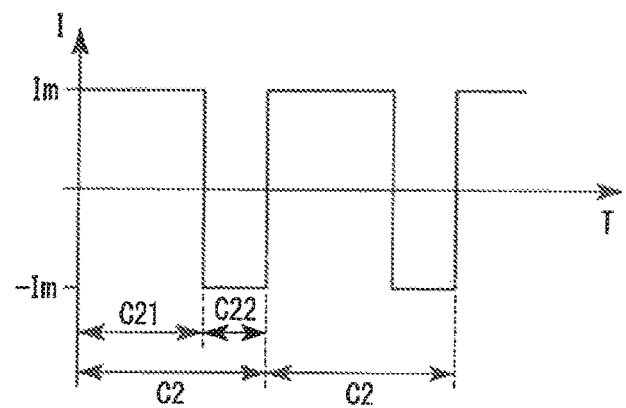
FIG. 12A is a diagram showing an example of a drive current waveform supplied to the discharge lamp in an imbalanced drive operation of the embodiment.
Figure 12B:
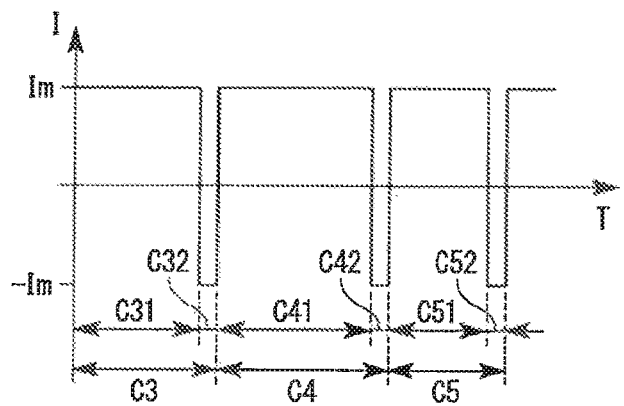
FIG. 12B is a diagram showing an example of the drive current waveform supplied to the discharge lamp in the imbalanced drive operation of the embodiment.
Figure 13:
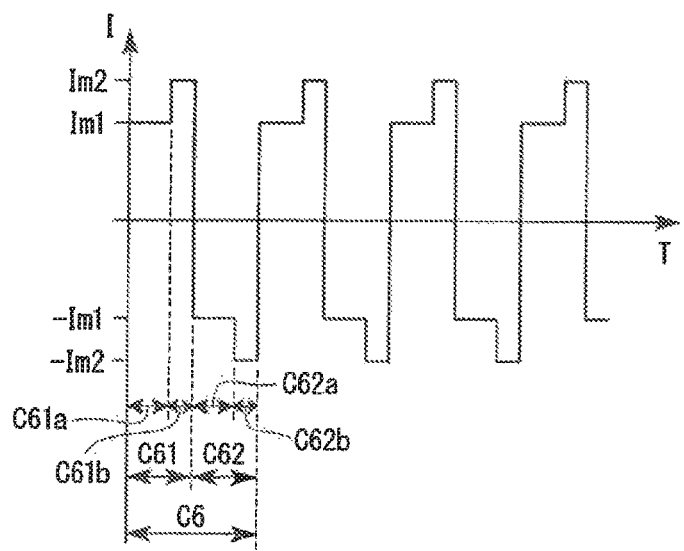
FIG. 13 is a diagram showing an example of a drive current waveform supplied to the discharge lamp in a jumping drive operation of the embodiment.

Further, the drive current waveform of the drive pattern DW is not particularly limited. For example, the drive current waveform of the drive pattern DW can also include the drive current waveforms shown in FIG. 12A, FIG. 12B and FIG. 13. FIG. 12A, FIG. 12B and FIG. 13 are each a diagram showing another example of the drive current waveform supplied to the discharge lamp 90 in the AC drive operation. In FIG. 12A, FIG. 12B and FIG. 13, the vertical axis represents the drive current I, and the horizontal axis represents time T. The drive current I is shown defining the case of the first polarity state as positive, and the case of the second polarity state as negative.

The AC drive operations shown in FIG. 12A and FIG. 12B are each an imbalanced drive operation with the duty ratio smaller than 0.5 (50%). The drive current I supplied to the discharge lamp 90 in each of the imbalanced drive operations shown in FIG. 12A and FIG. 12B is, for example, a rectangular wave AC current having the polarity inverted a plurality of times between the current value Im and the current value −Im.

In the imbalanced drive operation shown in FIG. 12A, the length of the period C2 is constant. In the period C2, there are provided a first polarity period C21 realizing the first polarity state, and a second polarity period C22 realizing the second polarity state. The length of the first polarity period C21 is longer than the length of the second polarity period C22. Specifically, the imbalanced drive operation shown in FIG. 12A has the number of cycles, the length of the period C2, the duty ratio, the length of the first polarity period C21 and the length of the second polarity period C22 as the drive parameters.

In the imbalanced drive operation shown in FIG. 12B, the length of the period varies. In the example shown in FIG. 12B, there are provided a first period C3, a second period C4, and a third period C5. The length of the first period C3 is longer than the length of the third period C5. The length of the second period C4 is longer than the length of the first period C3.

In the first period C3, there are provided a first polarity period C31 realizing the first polarity state, and a second polarity period C32 realizing the second polarity state. The length of the second polarity period C32 is shorter than the length of the first polarity period C31. In the second period C4, there are provided a first polarity period C41 realizing the first polarity state, and a second polarity period C42 realizing the second polarity state. The length of the second polarity period C42 is shorter than the length of the first polarity period C41. In the third period C5, there are provided a first polarity period C51 realizing the first polarity state, and a second polarity period C52 realizing the second polarity state. The length of the second polarity period C52 is shorter than the length of the first polarity period C51.

The length of the first polarity period C31 is longer than the length of the first polarity period C51. The length of the first polarity period C41 is longer than the length of the first polarity period C31. The length of the second polarity period C32, the length of the second polarity period C42, and the length of the second polarity period C52 are the same as each other. The lengths of the first polarity periods C31, C41, and C51 are, for example, no less than 5.0 ms (millisecond) and no more than 20 ms (millisecond). The lengths of the second polarity periods C32, C42, and C52 are shorter than 0.5 ms (millisecond).

Specifically, the imbalanced drive operation shown in FIG. 12B has the number of cycles, the lengths of the respective periods, the duty ratios, the lengths of the first polarity periods and the lengths of the second polarity periods as the drive parameters similarly to the imbalanced drive operation shown in FIG. 12A.

The AC drive operation shown in FIG. 13 is a jumping drive operation in which the absolute value of the drive current I jumps in each of the polarity states. The drive current I supplied to the discharge lamp 90 in the jumping drive operation shown in FIG. 13 is, for example, a rectangular wave AC current having the current value changing between Im1, Im2, −Im1, −Im2. The absolute value of Im2 and −Im2 is larger than the absolute value of Im1 and −Im1. In the jumping drive operation shown in FIG. 13, the length of the period C6 is constant. The duty ratio of the AC current shown in FIG. 13 is 0.5 (50%).

In the period C6, there are provided a first polarity period C61 realizing the first polarity state, and a second polarity period C62 realizing the second polarity state. The length of the first polarity period C61 and the length of the second polarity period C62 are the same as each other. The first polarity period C61 includes a low current period C61a and a high current period C61b. The low current period C61a is a period in which the drive current I is at a current value Im1. The high current period C61b is a period in which the drive current I is at a current value Im2. The length of the high current period C61b is shorter than the length of the low current period C61a.

The second polarity period C62 includes a low current period C62a and a high current period C62b. The low current period C62a is a period in which the drive current I is at a current value −Im1. The high current period C62b is a period in which the drive current I is at a current value −Im2. The length of the high current period C62b is shorter than the length of the low current period C62a. The length of the low current period C61a and the length of the low current period C62a are the same as each other. The length of the high current period C61b and the length of the high current period C62b are the same as each other.

Therefore, the jumping drive operation shown in FIG. 13 has the number of cycles, the length of the period C6, the absolute value of the current values Im1 and −Im1, the absolute value of the current values Im2 and −Im2, the length of the first polarity period C61, the length of the second polarity period C62, the length of the low current period C61a and the length of the high current period C61b in the first polarity period C61, the length of the low current period C62a and the length of the high current period C62b in the second polarity period C62, the proportion of the low current period C61a or the high current period C61b in the first polarity period C61, the proportion of the low current period C62a or the high current period C62b in the second polarity period C62, the ratio of the absolute value of the current values Im2 and −Im2 to the absolute value of the current values Im1 and −Im1, and so on as the drive parameters.

It should be noted that in the above description, the drive operations shown in FIG. 12A, FIG. 12B, and FIG. 13 are described as examples of the AC drive operation, but the AC drive operation is not limited to these examples. For example, it is also possible to assume the drive operations shown in FIG. 12A, FIG. 12B, and FIG. 13 as examples of the DC drive operation. In this case, the polarity of the DC drive operation and the length of the execution time of the DC drive operation arbitrarily change to thereby form the drive current waveforms shown in the drawings.

Further, although in the embodiment described above, an example of the case in which the invention is applied to the transmissive projector is explained, the invention can also be applied to reflective projectors. Here, "transmissive" denotes that the liquid crystal light valve including the liquid crystal panel and so on is a type of transmitting the light. Further, "reflective" denotes that the liquid crystal light valve is a type of reflecting the light. It should be noted that the light modulation device is not limited to the liquid crystal panel or the like, but can also be a light modulation device using, for example, micro-mirrors.

Further, although in the embodiment described above, there is cited the example of the projector 500 using the three liquid crystal panels 560R, 560G, and 560B (the liquid crystal light valves 330R, 330G, and 330B), the invention can be applied to a projector using a single liquid crystal panel alone, or a projector using four or more liquid crystal panels.

Further, the configurations described hereinabove can arbitrarily be combined with each other within a range in which the configurations do not conflict with each other.

Specific Example

A specific example and Comparative Examples 1, 2 were compared with each other to confirm the availability of the invention. In the specific example, the plurality of drive patterns DW were assumed to be based on the drive patterns DW having the drive current waveform shown in FIG. 9. Further, the drive parameters of the AC drive operation and the DC drive operation in the plurality of drive patterns DW are assumed to be the three types, namely the first frequency f1 and the second frequency f2, the lengths ta1, ta2 of the execution time of the AC drive operation, and the lengths td1, td2 of the execution time of the DC drive operation. Further, it was assumed that as the numerical values of each of the types of the drive parameters, the first frequency f1 and the second frequency f2 were selected from 200 Hz, 300 Hz, and 400 Hz, the lengths ta1, ta2 of the execution time of the AC drive operations were selected from 0.1 ms (millisecond), 0.2 ms (millisecond) and 0.5 ms (millisecond), and the lengths td1, td2 of the execution time of the DC drive operations were selected from 10 ms (millisecond), 20 ms (millisecond), and 30 ms (millisecond). Further, as the number of the drive patterns DW, totally 27 patterns were prepared by combining the three types of drive parameters described above and the numerical values thereof with each other.

In the specific example, the 27 drive patterns DW were made to arbitrarily be selected and executed using the machine learning of the embodiment described above. In Comparative Example 1, one preferable drive pattern DW was set in advance every 5 V of the lamp voltage Vla from the 27 drive patterns DW, and was executed. In Comparative Example 2, two preferable drive patterns DW were set in advance every 5 V of the lamp voltage Vla from the 27 drive patterns DW, and one drive pattern DW was made to arbitrarily be selected from the two drive patterns DW and then executed.

As the discharge lamp 90, a high-pressure mercury lamp rated at 200 W was used. The drive power Wd supplied to the discharge lamp was set to 200 W. In all of the specific example and Comparative Examples 1, 2, lighting for 2 h (hours) and extinction for 15 min (minutes) were made to alternately be repeated, and the illuminance of the discharge lamp was measured every time the accumulated lighting time of 500 h (hours) elapsed. The illuminance keeping ratio was calculated from the illuminance thus measured, and in the case in which the illuminance keeping ratio thus calculated became lower than 50%, the accumulated lighting time obtained when performing the measurement last time was obtained as the value of the life. The illuminance keeping ratio is the ratio of the present illuminance of the discharge lamp to the illuminance of the discharge lamp when lighting at the first time.

The measurement and calculation described above were performed on 10 discharge lamps in all of the specific example and Comparative Examples 1, 2, and then the average values of the life obtained were compared with each other. As a result, the life was 5000 h (hours) in Comparative Examples 1, 2 on the one hand, the life was 10000 h (hours) in the specific example on the other hand. Therefore, it was confirmed that the life of the discharge lamp could effectively be extended by performing the machine learning. According to the above, the availability of the invention was confirmed.

The entire disclosure of Japanese Patent Application No. 2017-180307, filed Sep. 20, 2017 is expressly incorporated by reference herein.

What is claimed is:

1. A discharge lamp drive device comprising:
    a discharge lamp driver configured to supply a drive current to a discharge lamp having a first electrode and a second electrode;
    a storage section configured to store a plurality of drive patterns of the drive current; and
    a control section configured to:
        control the discharge lamp driver;
        perform a machine learning evaluation of the plurality of drive patterns;
        select one drive pattern of the plurality of drive patterns based on the machine learning evaluation; and
        execute the selected drive pattern.

2. The discharge lamp drive device according to claim 1, further comprising:
    a voltage detection section configured to detect an inter-electrode voltage of the discharge lamp,
    wherein the control section is configured to perform the selection of the drive pattern based on a change in the inter-electrode voltage.

3. The discharge lamp drive device according to claim 2, wherein in a case where the change in the inter-electrode voltage fulfills a first predetermined condition when the selected drive pattern is being executed, the control section is configured to switch from the selected drive pattern to another drive pattern.

4. The discharge lamp drive device according to claim 3, wherein the control section is configured to prevent the execution of the selected drive pattern for a predetermined period from when switching to the other drive pattern.

5. The discharge lamp drive device according to claim 2, wherein the control section is configured to execute, in a certain period, both of a drive pattern which makes the inter-electrode voltage closest to a predetermined voltage value out of the plurality of drive patterns, and a different one of the plurality of drive patterns from the drive pattern which makes the inter-electrode voltage closest to the predetermined voltage value.

6. The discharge lamp drive device according to claim 2, wherein in a case where the change in the inter-electrode voltage between before execution of the selected drive pattern and after the execution of the selected drive pattern fulfills a second predetermined condition, the control section is configured to execute the selected drive pattern a plurality of times in a row.

7. The discharge lamp drive device according to claim 2, wherein in a case where the inter-electrode voltage decreases by a predetermined value or more, the control section is configured to switch the drive pattern to last-time-executed drive pattern.

8. The discharge lamp drive device according to claim 2, wherein the control section is configured to:
    in a case where a predetermined time has elapsed from a start of the execution of the selected drive pattern, select a different one of the plurality of drive patterns from the selected drive pattern; and
    change a length of the predetermined time based on the inter-electrode voltage.

9. A projector comprising:
    a discharge lamp configured to emit light; and
    the discharge lamp drive device according to claim 1;
    a light modulation device configured to modulate light emitted from the discharge lamp in accordance with an image signal; and
    a projection optical system configured to project the light modulated by the light modulation device.

10. A projector comprising:
    a discharge lamp configured to emit light; and
    the discharge lamp drive device according to claim 2;
    a light modulation device configured to modulate light emitted from the discharge lamp in accordance with an image signal; and
    a projection optical system configured to project the light modulated by the light modulation device.

11. A projector comprising:
    a discharge lamp configured to emit light; and
    the discharge lamp drive device according to claim 3;
    a light modulation device configured to modulate light emitted from the discharge lamp in accordance with an image signal; and
    a projection optical system configured to project the light modulated by the light modulation device.

12. A projector comprising:
    a discharge lamp configured to emit light; and
    the discharge lamp drive device according to claim 4;
    a light modulation device configured to modulate light emitted from the discharge lamp in accordance with an image signal; and
    a projection optical system configured to project the light modulated by the light modulation device.

13. A projector comprising:
    a discharge lamp configured to emit light; and
    the discharge lamp drive device according to claim 5;
    a light modulation device configured to modulate light emitted from the discharge lamp in accordance with an image signal; and
    a projection optical system configured to project the light modulated by the light modulation device.

14. A projector comprising:

a discharge lamp configured to emit light; and the discharge lamp drive device according to claim 6;

a light modulation device configured to modulate light emitted from the discharge lamp in accordance with an image signal; and a projection optical system configured to project the light modulated by the light modulation device.

15. A projector comprising:

a discharge lamp configured to emit light; and the discharge lamp drive device according to claim 7;

a light modulation device configured to modulate light emitted from the discharge lamp in accordance with an image signal; and a projection optical system configured to project the light modulated by the light modulation device.

16. A projector comprising:

a discharge lamp configured to emit light; and the discharge lamp drive device according to claim 8;

a light modulation device configured to modulate light emitted from the discharge lamp in accordance with an image signal; and a projection optical system configured to project the light modulated by the light modulation device.

17. A discharge lamp drive method for supplying a drive current to a discharge lamp having a first electrode and a second electrode to drive the discharge lamp, the method comprising:

performing a machine learning evaluation of a plurality of drive patterns of the drive current;

selecting one drive pattern of the plurality of drive patterns of the drive current based on the machine learning evaluation; and executing the selected drive pattern.

* * * * *